US007933792B2

(12) United States Patent
Barnard et al.

(10) Patent No.: US 7,933,792 B2
(45) Date of Patent: Apr. 26, 2011

(54) SYSTEM FOR PROJECT PREPARING A PROCUREMENT AND ACCOUNTS PAYABLE SYSTEM SURFACE

(75) Inventors: Ray F. Barnard, Endicott, NY (US);
Carl S. Baumann, Vestal, NY (US);
Philip J. Cirulli, Endicott, NY (US);
Kerin J. Flannery, Endicott, NY (US);
Carl J. Lanuti, Endwell, NY (US); John I. Munson, Binghamton, NY (US); Karl J. Ritch, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 12/061,192

(22) Filed: Apr. 2, 2008

(65) Prior Publication Data

US 2008/0306755 A1 Dec. 11, 2008

Related U.S. Application Data

(62) Division of application No. 09/444,254, filed on Nov. 22, 1999, now Pat. No. 7,437,304.

(51) Int. Cl.
*G06F 9/44* (2006.01)
(52) U.S. Cl. .................. 705/7; 705/8; 705/9; 705/30
(58) Field of Classification Search .................. 705/7, 8, 705/9, 30
See application file for complete search history.

(56) References Cited

U.S. PATENT DOCUMENTS

| | | | |
|---|---|---|---|
| 4,862,376 A | 8/1989 | Ferriter et al. | |
| 4,875,162 A | 10/1989 | Ferriter et al. | |
| 5,189,606 A | 2/1993 | Burns et al. | |
| 5,224,034 A | 6/1993 | Katz et al. | |
| 5,233,513 A | 8/1993 | Doyle | |
| 5,283,745 A | 2/1994 | Tanaka | |
| 5,287,267 A | 2/1994 | Jayaraman et al. | |
| 5,315,509 A | 5/1994 | Natarajan | |
| 5,321,610 A | 6/1994 | Breslin | |
| 5,381,332 A | 1/1995 | Wood | |

(Continued)

OTHER PUBLICATIONS

Anonymous, RD 417032, "On-Line IP portfolio management and advice using private network or Internet—provides confidential access to client's own IP data including historic and future predicted costs, with facility of updating data and sending and receiving information via network", Derwent Info Ltd., Dialog File 351:Derwent WPI data base printout, Abstract, Jan. 10, 1999.

(Continued)

*Primary Examiner* — Elaine Gort
(74) *Attorney, Agent, or Firm* — Schmeiser, Olsen & Watts; William E. Schiesser

(57) ABSTRACT

A system for coordinating a project for designing, implementing, and using a general procurement and accounts payable (GP/AP) system for a customer. A playbook database is created and includes templates of information relating to designing, implementing, and using the GP/AP system. The templates are particularized for the customer. A playbook summary view is generated from the playbook database. The playbook summary view displays a folders and views section, a task title display and selection area, a summary task creation button, and a detailed task creation button, which visually appear together in an undivided display area within the playbook summary view. Communication is between team members of a team and the playbook database via a server coupled to the playbook database and an intranet coupled to both the server and the team members. The team members have responsibility for the designing and implementing of the GP/AP system.

11 Claims, 21 Drawing Sheets

U.S. PATENT DOCUMENTS

| | | | |
|---|---|---|---|
| 5,450,317 | A | 9/1995 | Lu et al. |
| 5,537,591 | A | 7/1996 | Oka |
| 5,737,727 | A | 4/1998 | Lehmann et al. |
| 5,793,632 | A | 8/1998 | Fad et al. |
| 5,842,193 | A | 11/1998 | Reilly |
| 5,848,394 | A | 12/1998 | D'Arrigo et al. |
| 5,970,475 | A | 10/1999 | Barnes et al. |
| 6,041,312 | A | 3/2000 | Bickerton et al. |
| 6,067,477 | A | 5/2000 | Wewalaarachchi et al. |
| 6,115,690 | A | 9/2000 | Wong |
| 6,151,702 | A | 11/2000 | Overturf et al. |
| 6,253,244 | B1 | 6/2001 | Moore et al. |
| 6,256,676 | B1 | 7/2001 | Taylor et al. |
| 6,381,610 | B1 | 4/2002 | Gundewar et al. |
| 7,437,304 | B2 | 10/2008 | Barnard et al. |

OTHER PUBLICATIONS

Noori, Hamid; Production and Operations Management; 1995, McGraw-Hill, Inc.; pp. 376-416. (Cited on PTO-892 with Final Office Action Mail Date Jan. 27, 2003 for U.S. Appl. No. 09/444,254. Copy received from Eaminer).

Microsoft Press Computer Dictionary; Microsoft Press, 3rd Edition, 1997; p. 508 (Cited on PTO-892 with Final Office Action Mail Date Jul. 28, 2004 for U.S. Appl. No. 09/444,254. Copy received from Examiner).

Printed Screen of Windows 95 (illustrating a contiguous screen similar to Applicants show in Applicant's Figure 16/18) (Cited on PTO-892 with Examiner's Answer dated Mar. 11, 2005 for U.S. Appl. No. 09/444,254. Copy received from Examiner).

Office Action dated Nov. 30, 2010 for U.S. Appl. No. 12/059,345, Filing Date Mar. 31, 2008.

U.S. Appl. No. 12/061,112, Filing Date Apr. 2, 2008.

Non-Final Rejection dated Apr. 20, 2001 for U.S. Appl. No. 09/444,254.

Final Rejection dated Sep. 20, 2001 for U.S. Appl. No. 09/444,254.

Advisory Action dated Dec. 14, 2001 for U.S. Appl. No. 09/444,254.

Non-Final Rejection dated Feb. 12, 2002 for U.S. Appl. No. 09/444,254.

Non-Final Rejection dated Aug. 29, 2002 for U.S. Appl. No. 09/444,254.

Final Rejection dated Jan. 27, 2003 for U.S. Appl. No. 09/444,254.

Non-Final Rejection dated Jun. 2, 2003 for U.S. Appl. No. 09/444,254.

Final Rejection dated Oct. 16, 2003 for U.S. Appl. No. 09/444,254.

Advisory Action dated Jan. 14, 2004 for U.S. Appl. No. 09/444,254.

Non-Final Rejection dated Apr. 13, 2004 for U.S. Appl. No. 09/444,254.

Final Rejection dated Jul. 28, 2004 for U.S. Appl. No. 09/444,254.

Advisory Action dated Sep. 7, 2004 for U.S. Appl. No. 09/444,254.

Examiner's Answer to Appeal Brief dated Mar. 11, 2005 for U.S. Appl. No. 09/444,254.

Examiner's Answer to Appeal Brief dated May 17, 2006 for U.S. Appl. No. 09/444,254.

BPAI Decision dated Aug. 15, 2007 for U.S. Appl. No. 09/444,254.

Ex Parte Quayle Action dated Dec. 27, 2007 for U.S. Appl. No. 09/444,254.

Notice of Allowance dated Mar. 7, 2008 for U.S. Appl. No. 09/444,254.

Supplemental Notice of Allowance dated Jun. 2, 2008 for U.S. Appl. No. 09/444,254.

SYSTEM FOR PROJECT PREPARING A PROCUREMENT AND ACCOUNTS PAYABLE SYSTEM SURFACE

This application is a divisional application claiming priority to Ser. No. 09/444,254, filed Nov. 22, 1999 now U.S. Pat. No 7,437,304.

CROSS REFERENCES TO RELATED APPLICATIONS

U.S. patent application Ser. No. 09/444,257, entitled "System and Method for Assessing a Procurement and Accounts Payable System", Ser. No. 09/444,255, entitled "System and Method for Project Designing and Developing a Procurement and Accounts Payable Process", Ser. No. 09/444,253, entitled "System and Method for Deploying a Procurement and Accounts Payable Process", and Ser. No. 09/444,256, entitled "System and Method for Ongoing Supporting a Procurement and Accounts Payable Process" filed concurrently herewith, assignee docket numbers EN999043, EN999117, EN999118, and EN999119, respectively, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to the implementation of a procurement and accounts payable system or application. More particularly, it relates to a system and method for assessing, preparing, designing and developing, deploying, and supporting a general procurement and accounts payable system using electronic requisitions.

2. Background Art

A services company may be very good at implementing information technology (IT) solutions. However, as customer engagements increase, the ability of company to execute numerous engagements on time and within budget with quality becomes more difficult.

Today there exist many different software packages that perform project management and classes that teach methodologies for implementing solutions that involve information technology and services. However, there is no process that combines these activities along with an evaluation of a client_s general procurement (GP) and accounts payable (AP) system, or application, into one package while providing detailed implementation instructions along with templates for completing the major deliverables required over the course of the project. Templates, may be used herein as an equivalent term for page, form, or document as used in connection with Lotus Notes. In Lotus Notes, a page is a database design element that displays information; a form, like a page, displays information and also can be used to collect information; and documents are the elements that store information in the database. A user is presented a form including fields for entering information. When the user fills out the information and saves it, the information is saved in the data base as a document. When a user opens the document, the document uses the form as a template to provide the structure for displaying the data or information. Fields store data of various types, including text, dialog list, rich text, and so forth.

Scalability of engagements is a known problem, the most common solution to which is to increase the number of persons involved. Experience has shown that this increase results in customer dissatisfaction due to inadequate gathering of requirements, poorly trained implementation teams, missed schedules, increased costs, and lower quality.

It is characteristic of general procurement and accounts payable systems that no two are identical, and may differ even within wholly owned subsidiaries of a single corporation.

Consequently, there is a need in the art for a system and method for evaluating a potential client system and for adapting a general procurement and accounts payable system to the requirements of each of many potential clients. Further, there is a need for a system and method for evaluating a potential client system and for adapting a general procurement and accounts payable system to the requirements of each of many potential clients which can be licensed to third party providers together with a system and method for monitoring and assuring the quality of services provided by those service providers.

There is a need in the art for an integrated system for assessing, preparing, designing and developing, deploying, and supporting a procurement and accounts payable system using electronic requisitions.

During project assessment, typically potential customers are contacted and evaluated by a marketing team that then recommends a product solution from their menu. There is no integration of Technical Team Leaders and Transition Management as key components of the installation. There is also limited to no flexibility to customize the product for the customer.

There is a large body of work on project planning in industry. While they are all more or less adequate, they do not provide the comprehensive integration of the client and supplier teams, Transition Management, and Quality required to accomplish a particular customer's goals.

Like project planning, project design and development processes are well known in industry. They usually consist of a project manager or team leader that manages the implementation of a project plan and interfaces with the client.

Deployment or implementation of a project is, again, a very standard operation. As the project plan steps are completed, they are usually held in queue until all necessary activities reach a point where the solution can be "turned on".

All projects have close out functions that wrap up the end of the project. However, they do not provide for continuing support across the multitude of functions that have been used to provide the customer with a solution.

It is an objective of the invention to provide a system and method for evaluating a client's general procurement and accounts payable (GP/AP) system.

It is an object of the invention to provide an optimized solution for out-sourcing procurement of goods and services.

It is an object of the invention to provide a system and method for training service providers.

It is an object of the invention to provide a system and method for managing service providers to assure quality of service.

It is an object of the invention to provide a system and method for managing a project.

It is an object of the invention to provide an optimized general procurement and accounts payable system characterized by lower costs, a paperless process, and more comprehensive service with a shorter cycle time.

SUMMARY OF THE INVENTION

A system for preparing a general procurement and accounts payable application includes a server, a storage device connected to the server, a plurality of team terminals, and a communication link interconnecting the server and terminals. The server is operable for (1) maintaining a database on the storage device of templates describing procedures for preparing the application and (2) serving the templates to team members operating the terminals for coordinating, recording and tracking team activities with respect to preparing the application.

A method for preparing a general procurement and accounts payable application includes maintaining a database of templates describing procedures for preparing a general procurement and accounts payable application; and operating a plurality of web-enabled user terminals to access via a server the database of templates for coordinating tasks by a plurality of enterprise teams preparing the procedures.

In accordance with an aspect of the invention, there is provided a computer program product configured to be operable for preparing a general procurement and accounts payable application.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 5 and 6 also illustrate fields collected in the database and selectively displayed at user terminals of FIG. 1 for each summary and detail task, respectively, of a GP/AP system for a particular customer or project.

BEST MODE FOR CARRYING OUT THE INVENTION

Figure 1:
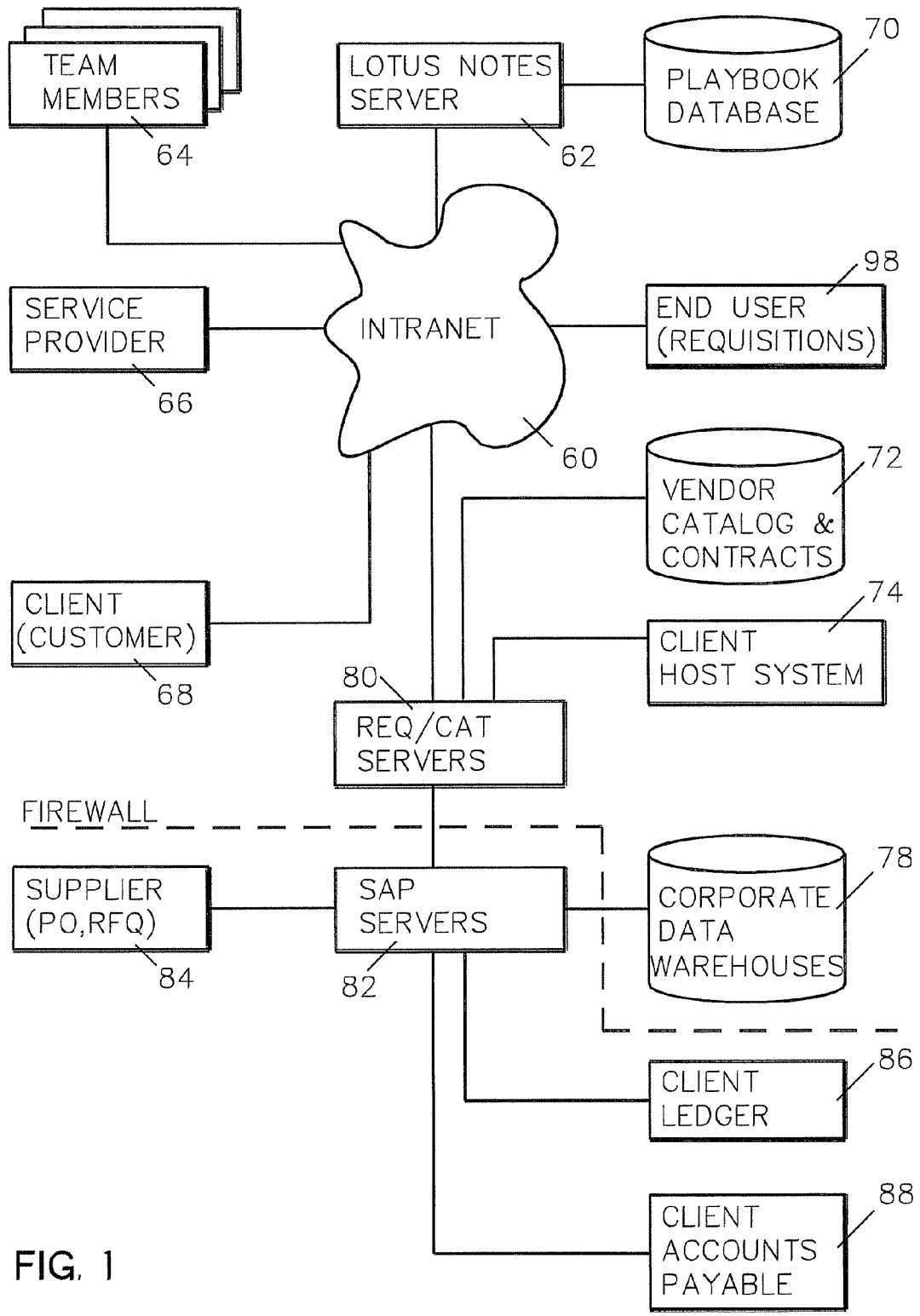
FIG. 1 is a high level block diagram of a general procurement and accounts payable development and implementation system in accordance with a preferred embodiment of the invention.

Referring to FIG. 1, in accordance with the preferred embodiment of the invention, intranet communication facilities interconnect a plurality of team member terminals 64, zero or more service provider terminals 66, and client (also referred to as customer) terminals 68, and a server 62, preferably a Lotus Notes server.

Server 62 references and maintains playbook database 70. Database (also referred to as the playbook, or playbook database) 70 is provided for implementing procurement and accounts payable systems. This playbook 70 defines implementation steps and templates for creating the many required deliverables and project management functions. These functions include start and end dates, effort, duration, and so forth. This playbook also provides the steps and templates for training service providers 66 and serves as the repository for completed templates and as a source for auditing the performance of the service providers. As used herein, unless otherwise apparent from the context, system and applications are used to refer to hardware, software, procedures, instructional materials, and so forth, for implementing a general procurement and accounts payable process.

Also attached to intranet 60 are requisition and catalog (Req/Cat) servers 80. Server 80 functions as a front end server to accounting system server 82, and is connected to a file of vendor catalogs and contracts 72, to a client (customer) host system 74, and through a firewall to SAP servers 82. SAP server 82 is an accounting driver for the procurement and accounts payable (A/P) system of the customer. SAP servers 82 are connected to supplier systems 84, to a customer data warehouse 78, and to customer ledger and accounts payable systems 86, 88.

During the operational phase of a completed and functioning system, a customer (aka end user, or client) 98 enters requisitions via the intranet to server 80. Server 80 accesses client host system 74 for pricing, reports, etc., and vendor catalogs and contracts 72 to gather information needed by SAP servers 82 to generate purchase orders or requests for quotes (RFQs) to supplier 84, to update data warehouse 78, client ledger 86, and client accounts payable 88 systems. Warehouse 78 stores client data maintained by the supplier of the Req/Cat and general procurement system, which supplier may be the primary enterprise (a primary services organization, such as the IBM Corporation) with control of the design and implementation of the system, or a contractor of the enterprise qualified as a third party service provider.

In operation, during presales, assessment, preparation, development, deployment and support stages, team members 64, access database 70 via intranet 60 and server 62 to create a playbook including a detailed description of an accounts payable and Req/Cat system for a particular customer (aka client). This description is then used to personalize Req/Cat servers 80 and SAP servers 82 for the customer installation. During operation, a user 98 accesses Req/Cat server 80 via intranet 60 to enter a requisition or to query the status of previously entered requisition. When entering a requisition, Req/Cat responds to end user 98 with a form to complete. Req/Cat 80 accesses SAP server 82 through the firewall with the requisition or request for status. SAP server 82, responsive to a requisition, issues a purchase order or request for quote to supplier 84, and updates accounts payable 88 and ledger 86, as required through the normal procurement and accounting process implemented on behalf of the customer.

Figure 2:
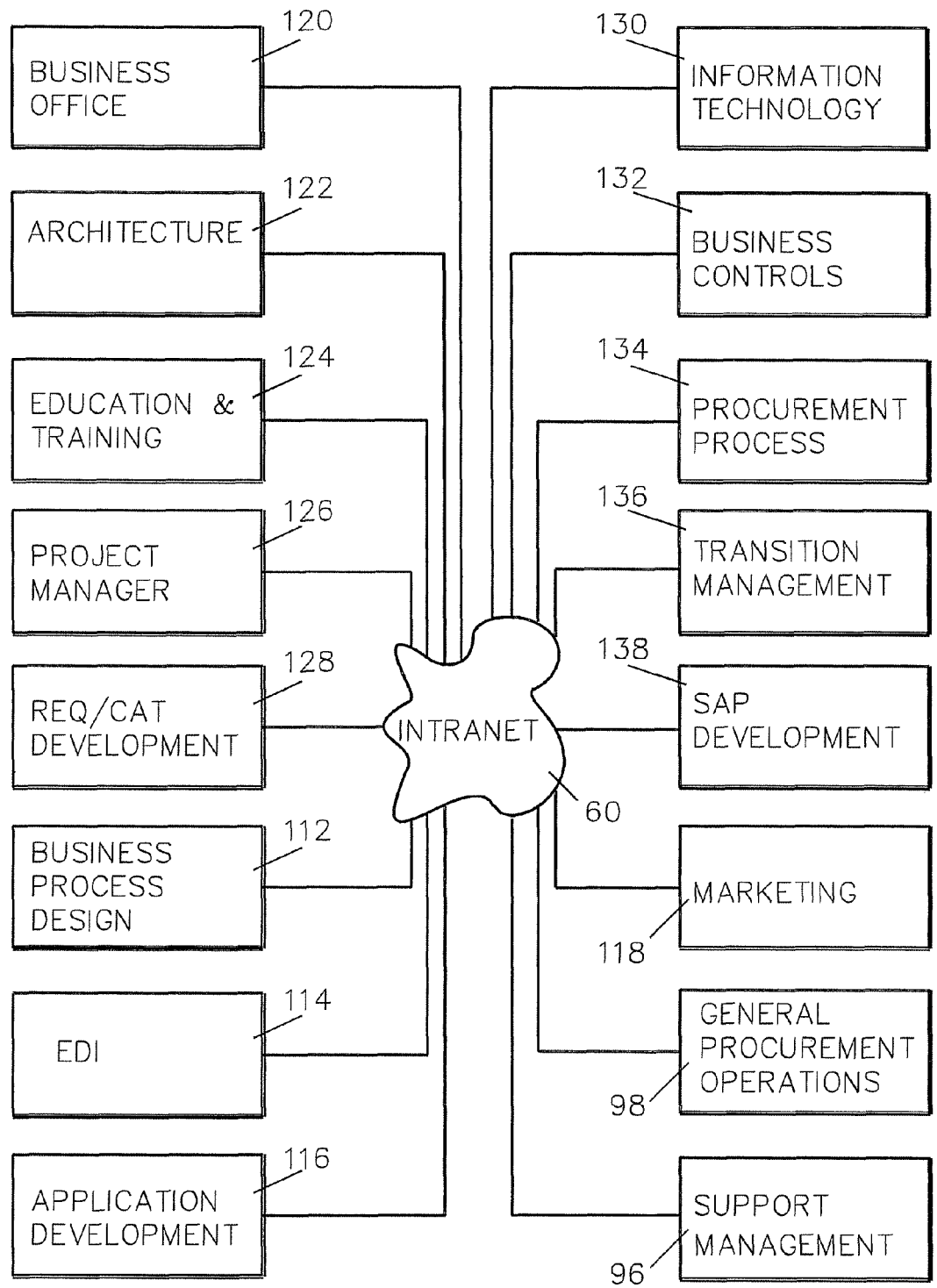
FIG. 2 is a block diagram illustrating team relationships within the general procurement and accounts payable (GP/AP) development and implementation system of a preferred embodiment of the invention.

Referring to FIG. 2, the various departments and individuals representing team members 64 include business office 120, architecture 122, education and training 124, project manager 126, Req/Cat development 128, business process design 112, electronic data interchange (EDI) 114, application development 116, information technology 130, business controls 132, procurement process 134, transition management 136, SAP development 138, marketing 118, general procurement operations 98, and support management 96. Each of these departments and individuals perform various rolls and functions during the life of the project from assessment through deployment and use, as will be more fully described hereafter in connection with FIG. 3.

Figure 3:
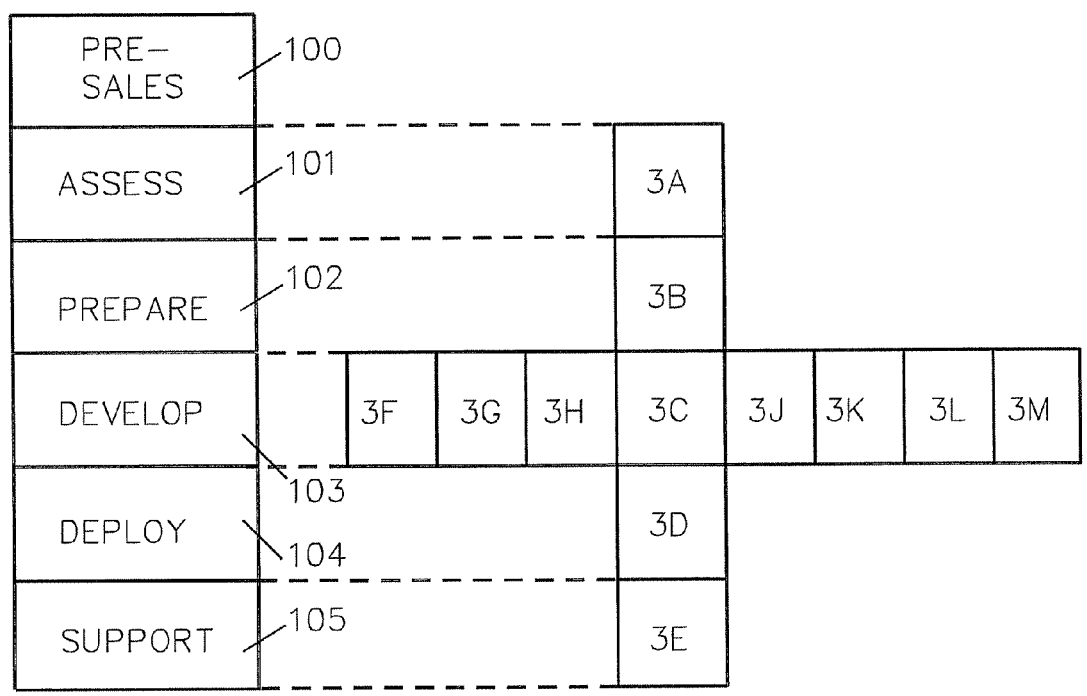
FIGS. 3A through 3M, arranged as shown in FIG. 3, are a flow diagram of the assessment, preparation, development, deployment and support phases of the method of a preferred embodiment of the invention.
Figure 3A:
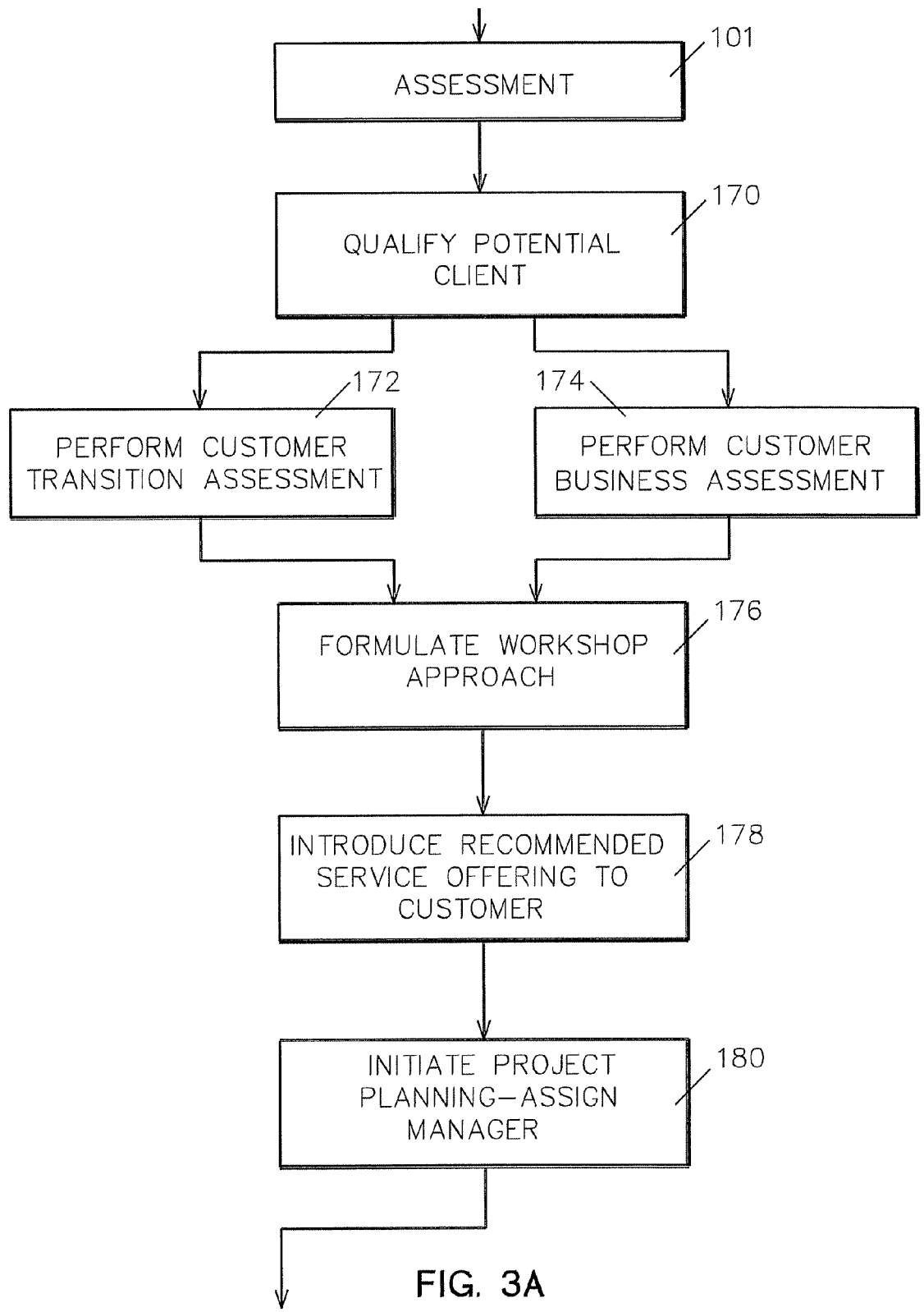

Referring to FIG. 3, in accordance with the preferred embodiment of the method of the invention, assessment 101, preparation 102, development 103, deployment 104 and support 105 stages are executed to design, implement, and use a general procurement and accounts payable (GP/AP) system for a customer. Through these stages 101-105, procedures and methods are provided for seamlessly integrating all aspects of a total GP/AP system, including creating an electronic purchase requisition for goods and services with flexible approval functions, through invoicing and payment.

Further in accordance with the preferred embodiment of the invention, there is provided a web enabled delivery system.

Further in accordance with the preferred embodiment of the invention, there is provided a system and method for auditing service provider activities without being on site.

High level summary tasks implemented by playbook 70 database include business controls, information technology, SAP, communication, process, testing, configuration, project management, transition management, education and training, requisition and catalog (Req/Cat). Each of these summary tasks, as well as the drill-down (aka subsidiary) tasks implementing the details of each, may be accessed by team members 64 and service provider 66s within the playbook database 70.

Figure 4:
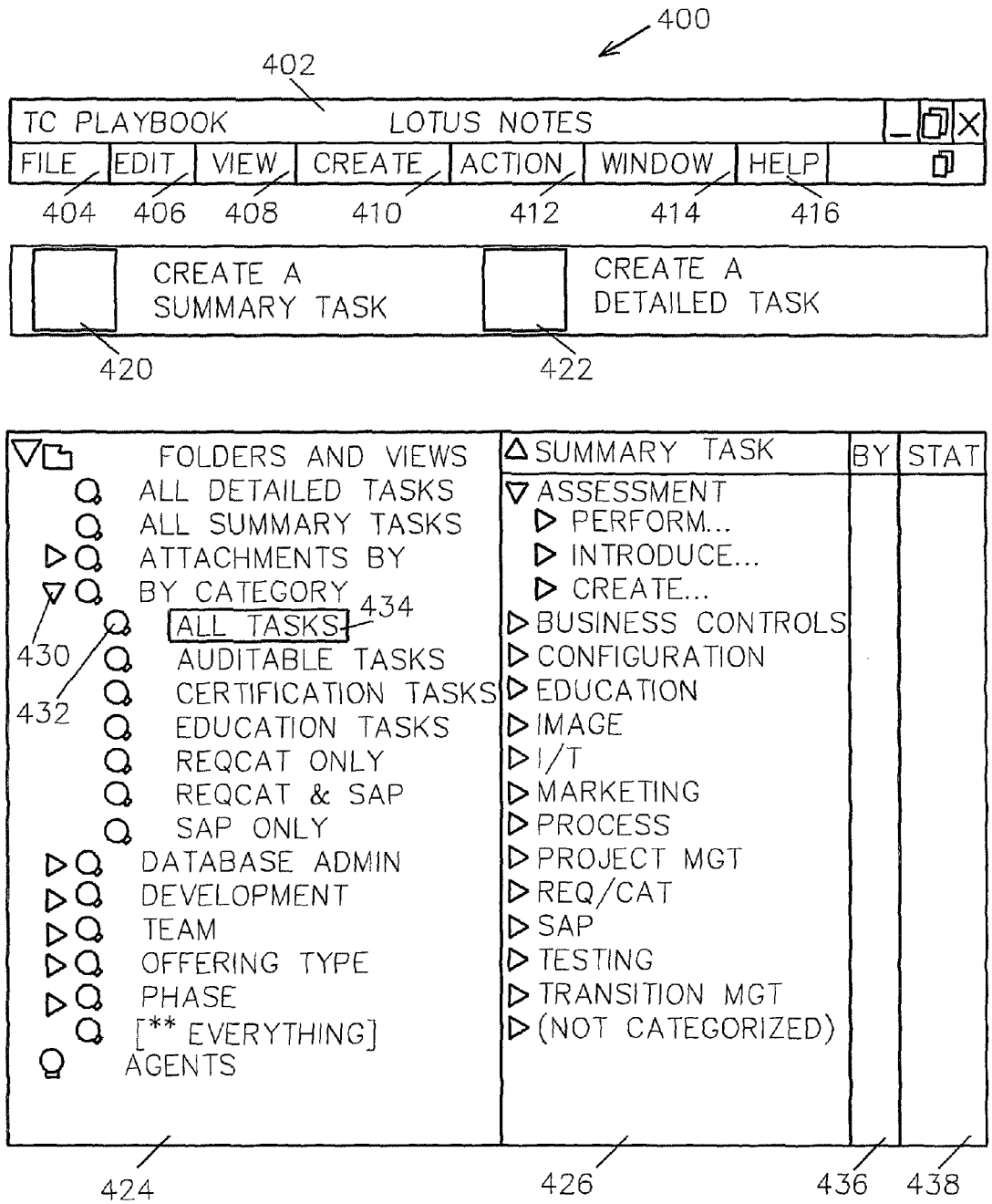
FIG. 4 represents a terminal display of a playbook summary view.

Referring to FIG. 4, the playbook summary view 400 is illustrated. View 400 includes a title bar 402; pull down menu tabs file 404, edit 406, view 408, create 410, actions 412, window 414, help 416; create a summary task selection button 420, create a detailed task button 422, a folders and views section 424, and a task title display and selection area 426 which also includes a by column 436 and a status column 438 with an entry for each task displayed in area 426. With by category button 430 and all tasks button 432 selected, all tasks 434 is highlighted and display 426 presents a listing of tasks organized by category.

Figure 5:
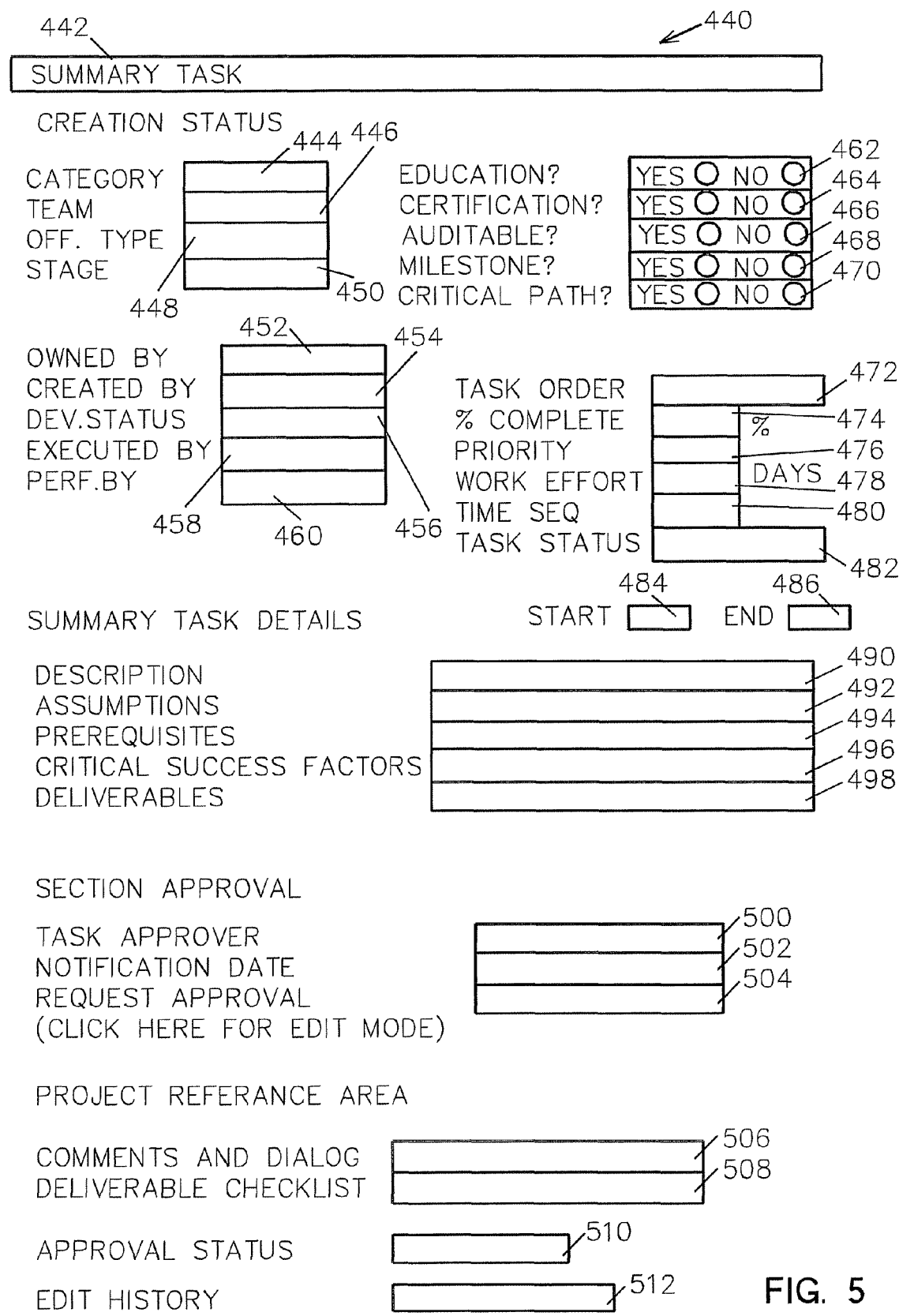
FIG. 5 illustrates a terminal display of the template presented by the server at a user terminal of FIG. 1 in response to selection by a user of "create a summary task" from the playbook summary view.

Referring to FIG. 5, the summary task template 440 presented to the user upon selection of create a summary task 420 is illustrated. As will be described hereafter, there are two flavors of template 440, one for major operations, and one for major steps within each major operation.

Figure 6:
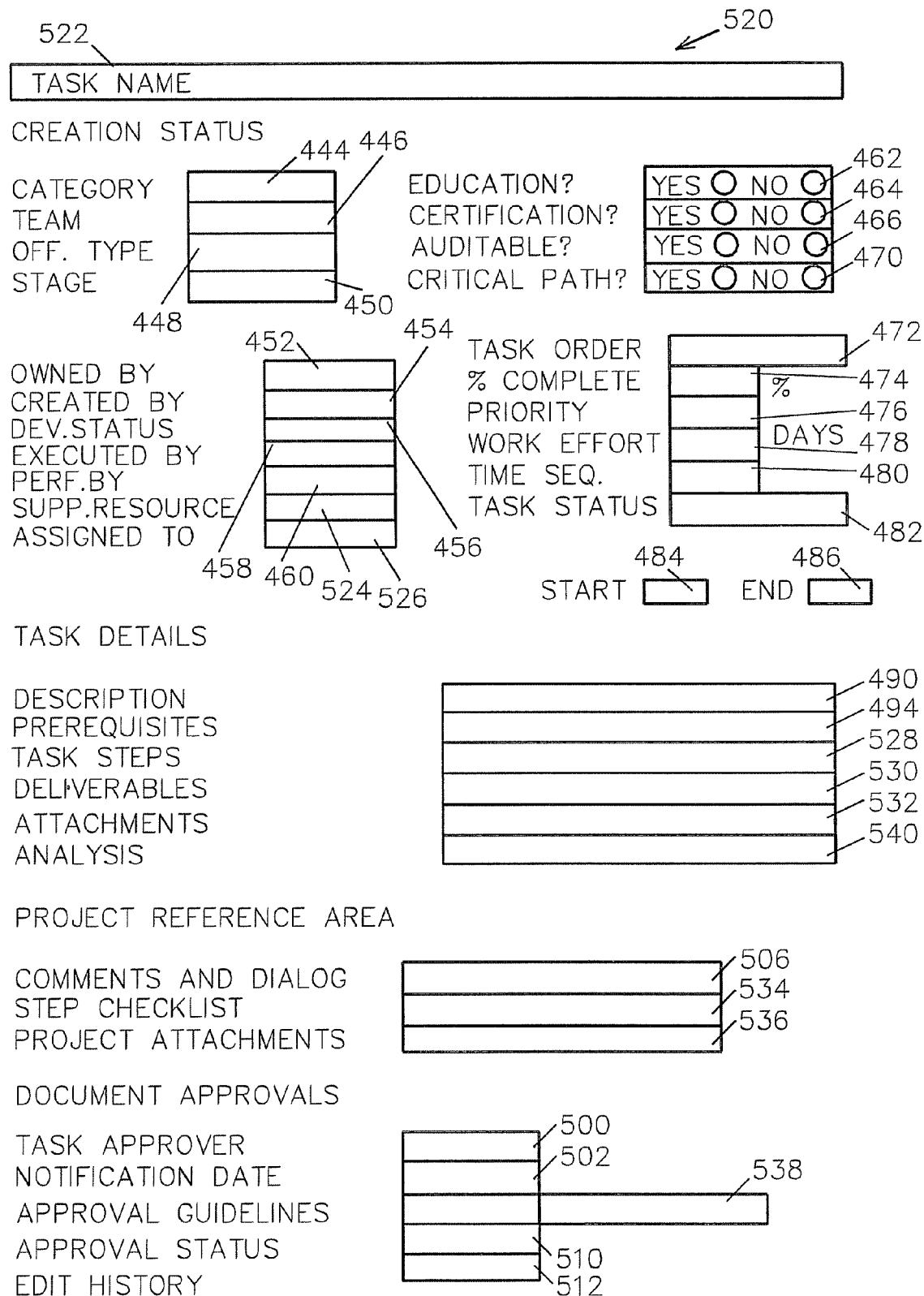
FIG. 6 illustrates a terminal display of the template presented by the server at a user terminal of FIG. 1 in response to selection by a user of "create a detailed task" from the playbook summary view.

Referring to FIG. 6, the detail task template 520 presented to the user upon selection of create a detailed task 422 is illustrated.

Figure 8:
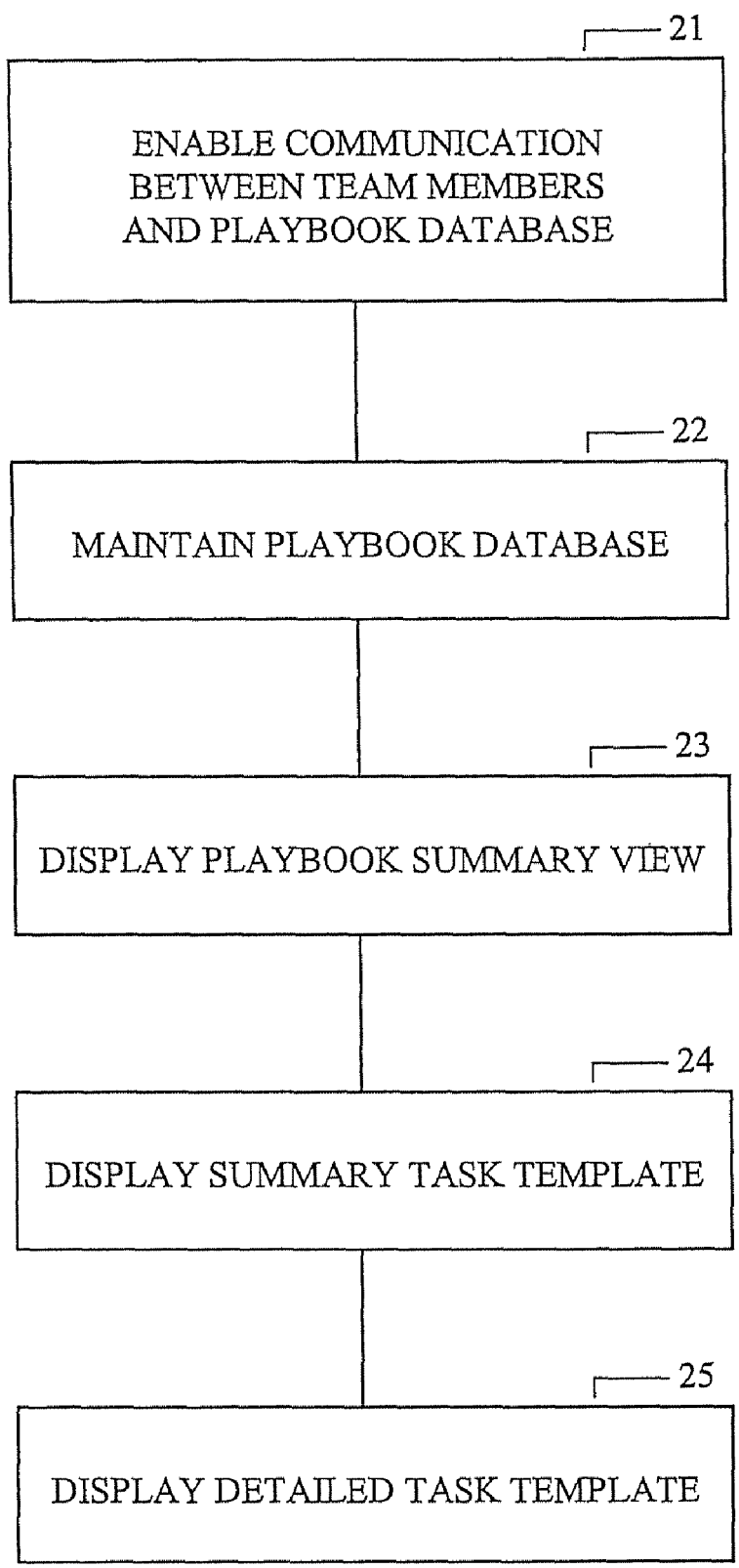
FIG. 8 is a flow chart depicting steps of a method for coordinating a project for designing, implementing, and using a general procurement and accounts payable (GP/AP) system for a customer, in accordance with the present invention.

FIG. 8 depicting steps 21-25 of a method for coordinating a project for designing, implementing, and using a general procurement and accounts payable (GP/AP) system for a customer, in accordance with the present invention.

Step 21 of FIG. 8 enables communication between team members of a team and a playbook database via a server coupled to the playbook database and an intranet coupled to both the server and the team members, as depicted in FIG. 1 for team members 64 coupled to the playbook database 70 via server 62 and intranet 60, described supra. The team members having responsibility for said designing and implementing of said GP/AP system as described infra.

Step 22 of FIG. 8 maintains a playbook database, illustrated as the playbook database 70 of FIG. 1. The playbook database comprises a plurality of templates of information relating to designing, implementing, and using the GP/AP system, the plurality of templates being particularized for the customer, described supra. Examples of templates of the plurality of templates include the summary task template 440 of FIG. 5 and the detail task template 520 of FIG. 6, described infra.

Step 23 of FIG. 8 displays a playbook summary view, illustrated as the playbook summary view 400 of FIG. 4, described infra. As shown in FIG. 4 and described infra, the playbook summary view comprises a folders and views section 424, a task title display and selection area 426, a summary task creation button 420, and a detailed task creation button 422.

Step 24 of FIG. 8 displays a summary task template, illustrated as the summary task template 440 of FIG. 5, described infra. The summary task template 440 of FIG. 5 is for a selected first task of the tasks identified in the task title display and selection area 426 of FIG. 4, wherein the summary task template being displayed is in response to a selection of the summary task creation button 420 of FIG. 4. The summary task template 440 of FIG. 5 includes summary parameters of the selected first task as described infra in conjunction with FIG. 5.

Step 25 of FIG. 8 displays a detailed task template, illustrated as the detailed task template 520 of FIG. 6, described infra. The detailed task template 520 of FIG. 6 is for a selected second task of the tasks identified in the task title display and selection area 426 of FIG. 4, wherein the detailed task template being displayed is in response to a selection of the detailed task creation button 422 of FIG. 4. The detailed task template 520 of FIG. 6 includes detailed parameters of the selected second task as described infra in conjunction with FIG. 6.

Selection of create summary task 420 presents a first summary task template 440 that used to design and describe a high level summary task for one of the playbook operations. In a preferred embodiment of the invention, there are thirteen such high level summary tasks, including assessment, business controls, configuration, education, image, information technology (I/T), marketing, process, project management, requisition and catalog (req/cat), SAP, testing, and transition management. The summary and detail tasks within these high level summary tasks are further organized into five major processing segments: assessment 101, project preparation 102, project design and development 103, deployment 104, and ongoing support 105. A high level summary task provides a summary of the inputs to the task, and of the output (deliverables) after all detailed tasks are completed. There two levels, or templates for summary tasks: one for major operations, the second for major steps within each operation.

Activation of create a detail task 422 presents to the user a third template 520 which is used to summarize the detailed tasks for each major step of a summary task.

The first and second templates 440 are almost identical. They include the fields set forth in Tables 1 and 2. Third template 520 contents are summarized in Table 3.

TABLE 1

SUMMARY TASK TEMPLATES PART

| | |
|---|---|
| SECTION 1: | CREATION STATUS |
| Category 444: | Categories include education, req/cat development, SAP development, transformation management, architecture, procurement process. |
| Team 446: | Specific project team responsible for this task. |
| Offering type 448: | Kind of product being brought to client: req/cat only, SAP only, and req/cat and SAP. |

TABLE 1-continued

SUMMARY TASK TEMPLATES PART

| | |
|---|---|
| Stage 450: | The stages are assessment 101, project preparation 102, project development 103, deployment 104, and support 105. |
| Doc owned by 452: | Team 140 owner of document, the designer of this one template. The teams 140 are those illustrated in FIG. 2. |
| Doc created by 454: | Author of this one template. |
| Dev status 456: | Approval status: first draft, final edit, final approval, etc. Only owner 452 can change this status. Only the owner 452 can approve the content of this template (task). |
| SECTION 2: | IMPORTANCE BUTTONS |
| Education 462: | Represents a combination of things, including (1) does someone need to be taught how to do this task, (2) is it something that should be included in the education package to the customer. |
| Certification 464: | Indicates whether or not an implementer of this task (ie, service provider) must be certified. |
| Auditable 466: | Indicates whether or not it is a task that Enterprise would be able to or needs to audit performance by the implementer/service provider |
| Milestone 468: | Indicates if this task is a critical accomplishment in the path of completing the implementation of the offering type. |
| Critical path 470: | Indicates if this is a task that must be completed in order to advance to the next task in order to complete the offering type, and can change during the course of the project as tasks are completed and the overall environment changes. |
| SECTION 3: | IMPLEMENTATION |
| Task order 472: | A number assigned to a detailed task that shows its order under the summary task. |
| % complete 474: | An estimate of how complete is this task document in its development for a particular customer. |
| Executed by 458: | Name of service provider (eg., Enterprise, or some Enterprise partner). |
| Performed by 460: | Technical team responsible for doing this task. |
| Priority 476: | High, medium, low priority, based on whether this task is in critical path, and whether or not it needs to be done in support of some subsequent task. |
| Work effort 478: | Estimated time required to complete this task. |
| Sequence 480: | A number assigned to a summary task that shows its order under a higher level task. |
| Task status 482: | Represents how far the service provider has progressed in its implementation of this task. This is rolled up to Lotus Notes database 70 to enable the owner to track progress of the service providers during the audit phase. |

Table 2 sets forth the template 440 fields which may vary between templates, including those for major operations and major steps within an operation.

TABLE 2

SUMMARY TASK TEMPLATES PART 2

| | |
|---|---|
| SECTION 4: | SUMMARY TASK DETAILS |
| Description 490: | High level summary description of major operations or steps. |
| Assumptions 492: | What if any assumptions apply. |
| Prerequisites 494: | Tasks that must be completed before this task can complete. |
| Critical success factors 496: | Description of tools, techniques, relationships, understandings, technical and relationship skills and commitments, knowledge base of team and customer, and so forth, needed to accomplish this task. |
| Deliverables 498: | Expected output of this task. |
| SECTION 5: | APPROVALS |
| Task approver 500: | Identity of approvers. |
| Notification date 502: | Date approvers notified. |
| Request approval 504: | Electronic signature of approval. |
| SECTION 6: | PROJECT REFERENCE |
| Comments and dialog 506: | General comments (open season). |
| Deliverable checklist 408: | Checklist of deliverables. |
| Approval status 510: | List of approvers of this document and status of their approval. |
| Edit history 512: | Listing of persons who have modified this document during its preparation (service provider is not allowed to change these task descriptions.) |

TABLE 3

DETAIL TASK TEMPLATE

| | |
|---|---|
| SECTION 1: | CREATION STATUS |
| SECTION 2: | IMPORTANCE BUTTONS |
| SECTION 3: | IMPLEMENTATION |
| Sections 1, 2 and 3 are the same as for templates 440, with the addition of: | |
| Support resources 524: | People needed to support completion of this task. |
| Assigned to 526: | Person executing this task. |
| SECTION 4: | DETAIL TASK DETAILS |
| Description 490: | Description of this task. |
| Prerequisites 494: | Tasks that must be completed before this task can complete. |
| Task steps 528: | Specific detailed steps that need to be accomplished to complete the task. |
| Analysis 540: | A description of what needs to be analyzed to come up with the right answer for the customer. (The resulting output will vary depending upon the results of the analysis__but this document doesn__t change as a result of the analysis). |
| Deliverables 530: | Expected output of the task. |
| Methodology attachments 532: | Potential attachments, may be blank: anything from presentation charts, to questionnaires, to architecture charts - depends upon the task. |
| SECTION 5: | PROJECT REFERENCE AREA |
| Comments & Dialog 506: | Comments. |
| Deliverable Checklist 508: | Checklist, attachment listing (other than method attachments, supra). |
| Approval status 510 | List of approvers and the status of their approval (with respect to approval of this document, not of the implementation of the task, which is handled by the audit process). |

TABLE 3-continued

DETAIL TASK TEMPLATE

| | |
|---|---|
| Edit history 512: | Listing of persons who have modified this document during its preparation (service provider is not allowed to change these task descriptions.) |

Database 70 at server 62 includes all summary and detail tasks templates which have been completed in a set for a particular customer. An initial set of the tasks listed in Table 4 is provided for each customer, but during project implementation phases 101-105, these are configured or personalized to the customer.

While many summary and detailed tasks of Table 4 do not appear in the flow chart of FIGS. 3A-3M, those selected illustrate a flow from start to finish across the five major stages—and form a representative, if not critical, path through them. As shown in FIG. 3, and 3A-3M, the transitions between stages 100-105 are, in some instances, blurred and a particular task may be allocated to either or both of two of these stages.

In each stage, the key to success is the integration through the use of the templates of the groups (FIG. 2) and activities (Table 4, both summary tasks and detail tasks.) Also, an important aspect of the invention is the method provided across the five stages (FIG. 3) for effecting a transition from a legacy process, including hardware, software, work procedures and human resources, to a new process.

Table 4 is a chart of summary and detail tasks, pursuant to a particular embodiment of the invention, available for presentation in display area 426 of playbook summary view 400 upon selection of button 432. Selection by a user in display area 426 of a task designated with two or three alpha-numeric reference numerals P1, P11, P12, . . . , results in display of a template 440 personalized to the summary task, and selection of a task designated with four or more alpha-numeric reference numerals P111, P112, . . . , result in display of a template 520 personalized to the detail task. A user with appropriate authority may then view, correct, update, approve or otherwise modify the displayed task. The names of the detail tasks set forth broadly the functions or method steps performed in implementing the superior summary task. In Table 4, each summary task is identified in the first column by the stage 100-105 to which it pertains, in the second column by a task identifier P11, P12, . . . , and, for selected tasks, in the third column by the process step (150, . . . , 354 in FIGS. 3A-3M) to which it pertains. In general (with very few exceptions), a detail task pertains to the same stage 100-105 as its summary task.

TABLE 4

CHART OF SUMMARY AND DETAIL TASKS

| Stage | Task ID | Step | Summary Tasks / Detail Tasks |
|---|---|---|---|
| | | | FOLDERS AND VIEWS BY CATEGORY |
| | | | ALL TASKS |
| | P1 | | ASSESSMENT |
| 101 | P11 | | Perform customer service offering assessment |
| 101 | P111 | 174 | Perform customer business assessment |
| 101 | P112 | | Perform customer business assessment e-Req/Cat |
| 101 | P113 | | Develop workshop management plan |
| 101 | P114 | | Develop workshop management plan e-Req/Cat |
| 101 | P115 | | Review findings from marketing procurement consulting engagement |
| 101 | P116 | | Review findings from marketing procurement consulting engagement e-Req/Cat |
| 101 | P117 | 176 | Formulate workshop approach |
| 101 | P118 | | Formulate workshop approach e-Req/Cat |
| 101 | P119 | | Prepare for workshop |
| 101 | P11A | | Prepare for workshop e-req/Cat |
| 101 | P12 | 178 | Introduce recommend service offering to customer |
| 101 | P121 | | Present service offering to customer (perform workshop) |
| 101 | P122 | | Present service offering to customer (perform workshop) e-Req/Cat |
| 101 | P123 | | Formulate proposal approach |
| 101 | P124 | | Formulate proposal approach e-Req/Cat |
| 101 | P13 | | Create proposal and contract |
| 101 | P131 | | Develop and cost proposal |
| 101 | P132 | | Develop and cost proposal e-Req/Cat |
| 101 | P133 | | Draft and price customer contract |
| 101 | P134 | | Draft and price customer contract e-Req/Cat |
| | P2 | | BUSINESS CONTROLS |
| 103 | P21 | | Business control requirements |
| 103 | P211 | 290 | Confirm business controls requirements |
| 103 | P212 | | Confirm separation of duties (SOD) requirements |

TABLE 4-continued

CHART OF SUMMARY AND DETAIL TASKS

| Stage | Task ID | Step | Summary Tasks / Detail Tasks |
|---|---|---|---|
| 104 | P213 | 292 | Conduct ASCA self-assessment |
| 104 | P214 | | Risk assessment |
| 104 | P215 | 224, 294 | Conduct ASCA/business controls review |
| 102 | P2151 | | Confirm image production system management strategy |
| | P3 | | CONFIGURATION |
| 103 | P31 | 320 | Conduct Req/Cat functional detailed fit gap analysis |
| 103 | P311 | | Confirm Req/Cat organizational hierarchy |
| 103 | P312 | | Define the Req/Cat functional detailed fit |
| 103 | P313 | | Resolve functional gaps for Req/Cat |
| 103 | P32 | 324 | Configure Req/Cat offering |
| 103 | P321 | | Confirm and refine "Ives Team Studio" for code tracking |
| 103 | P322 | | Confirm and refine Req/Cat initial settings and organizational structure |
| 103 | P323 | | Confirm and refine Req/Cat authorizations |
| 103 | P324 | | Refine and validate final Req/Cat configuration |
| 103 | P33 | | Customize Req/Cat offering |
| 103 | P331 | | Validate and customize Req/Cat core application change request |
| 103 | P332 | | Refine and validate final customization for Req/Cat |
| 103 | P34 | | Produce custom Req/Cat programs |
| 103 | P341 | 276 | Validate and code bridge change requests (SAP and Req/Cat) |
| | P4 | | EDUCATION AND TRAINING |
| 102 | P41 | | Develop customer education and training strategy |
| 102 | P411 | | Validate customer education & training objectives |
| 102 | P412 | 190 | Define the training requirements and approach |
| 102 | P413 | | Confirm the education & training strategy |
| 102 | P42 | | Define system management processes |
| 102 | P421 | | Define SAP correction and transport process |
| 102 | P422 | | Define and agree on service level agreement SLA |
| 102 | P423 | | Define and administer SAP release control process |
| 102 | P424 | | Define Req/Cat transport process |
| 102 | P425 | | Define and administer version control process |
| 103 | P43 | 192 | Define user documentation and training requirements |
| 103 | P431 | | Define customer user audiences and requirements |
| 103 | P432 | | Confirm user documentation requirements and standards |
| 103 | P433 | | Conduct detailed end-user task analysis |
| 103 | P434 | | Assess user skills and training needs |
| 103 | P435 | | Validate end-user courses and content |
| 103 | P436 | | Identify users and course attendees |
| 103 | P437 | | Define and notify training attendees |
| 103 | P44 | | Develop user training documentation |
| 103 | P441 | | Produce customer specific end-user documentation |
| 103 | P442 | | Confirm training evaluation materials/approach with customer |
| 103 | P443 | 194 | Setup training system environment |
| 103 | P444 | | Validate training logistics |
| 103 | P445 | 198 | Conduct pilot training with super users |
| 103 | P446 | 196 | Arrange documentation and training material production |
| 103 | P45 | | Internal (Enterprise, service provider) training requirements |

TABLE 4-continued

CHART OF SUMMARY AND DETAIL TASKS

| Stage | Task ID | Step | Summary Tasks / Detail Tasks |
|---|---|---|---|
| 103 | P451 | | Identify and organize appropriate internal training |
| 104 | P46 | | Conduct end-user training |
| 104 | P461 | | Conduct train-the-trainer sessions |
| 104 | P462 | 214, 230 | Perform training |
| 104 | P463 | 212 | Conduct new buyer training |
| | P5 | | IMAGE |
| 103 | P51 | | Conduct image functional detailed fit gap analysis |
| 103 | P511 | | Define the image functional detailed fit |
| 103 | P512 | | Resolve image functional gaps |
| 103 | P52 | | Configure image offering |
| 103 | P521 | | Refine and validate final image configuration |
| 103 | P522 | | Confirm and refine image initial settings |
| | P6 | | I/T |
| 103 | P61 | | Establish customer network/computing infrastructure |
| 103 | P611 | | Confirm component delivery |
| 103 | P612 | | Establish network/computing hardware/software architecture infrastructure |
| 103 | P613 | | Ready network/computing environment |
| 103 | P62 | | Establish EDI infrastructure |
| 103 | P621 | | Establish EDI infrastructure |
| 103 | P622 | | Conduct trading partner testing (IT) |
| 102 | P623 | | Confirm EDI strategy |
| 102 | P6231 | | Setup image system environments |
| 103 | P6232 | | Establish cutover checklist and perform pre-cutover activities for image production environment |
| 104 | P6233 | | Validate image production support for system management |
| 103 | P63 | | Develop reporting infrastructure |
| 103 | P631 | | Develop reporting infrastructure (LIS/EIS) |
| 103 | P632 | | Develop DataMart extracts |
| 103 | P633 | 232 | Develop additional reports (customer/operations) |
| 102 | P64 | | Perform bridge architecture assessment |
| 102 | P641 | | Perform bridge architecture integration point interfaces work session |
| 102 | P642 | 158 | Define bridge architecture project objectives document |
| 102 | P65 | | Validate bridge, EDI, vendor reporting requirements |
| 102 | P651 | 270 | Develop and manage bridge architecture implementation work plan |
| 102 | P652 | | Analyze EDI requirements |
| 102 | P653 | | Determine EDI communication environment |
| 102 | P654 | | Analyze vendor master data load |
| 102 | P655 | | Analyze operational reporting requirements |
| 102 | P656 | | Analyze customer requirements for DataMart implementation |
| 102 | P657 | | Schedule and conduct weekly interlock meeting |
| 102 | P658 | | Vendor lead client analysis |
| 102 | P66 | | Set up development/integration environment |
| 102 | P661 | | Set up SAP development/integration environment |
| 102 | P662 | | Set up Req/Cat system environments |
| 103 | P67 | | Set up consolidation/test environment |
| 103 | P671 | | Set up SAP consolidation/test environment |
| 104 | P68 | 218 | Set up production environment |
| 104 | P681 | | Convert vendor master into production environment |

TABLE 4-continued

CHART OF SUMMARY AND DETAIL TASKS

| Stage | Task ID | Step | Summary Tasks / Detail Tasks |
|---|---|---|---|
| 104 | P682 | | Determine EDI tasks for production environment set up |
| 104 | P683 | | Execute SAP cutover checklist |
| 104 | P684 | | Set up SAP production environment |
| 104 | P685 | | Establish SAP batch schedule |
| 104 | P686 | | Set up trading partners in production environment |
| 104 | P687 | | Vendor lead client deployment |
| 103 | P688 | | Establish cutover checklist and perform pre-cutover activities for SAP production environment |
| 103 | P689 | | Establish cutover checklist and perform pre-cutover activities for e-Req/Cat production environment |
| 105 | P69 | | Refine/execute production support for system management |
| 105 | P691 | 234 | Perform on-going support activities for Req/Cat |
| 105 | P692 | | Post deployment reporting support |
| 105 | P693 | | Develop new bridges and application extensions post go live |
| 105 | P694 | 236 | Support new EDI transactions post go live |
| 105 | P695 | | Execute system management security support procedures |
| 105 | P696 | | Execute data management support procedures |
| 105 | P697 | 236 | Execute EDI support procedures |
| 105 | P698 | | Execute system management operational support desk procedures |
| 105 | P699 | | Execute system management batch support desk procedures |
| 105 | P69A | | Execute system management SAPBI support procedures |
| 105 | P69B | | Execute system management master data support procedures |
| 105 | P69C | | Execute production support for system management |
| 103 | P6A | | Establish vendor master environment |
| 103 | P6A1 | | Establish vendor master |
| 103 | P6A2 | | Confirm vendor master |
| 103 | P6A3 | | ALE configuration for VLC |
| 103 | P6B | | Establish bridge architecture infrastructure environment |
| 103 | P6B1 | 272 | Develop detail architecture requirements definition |
| 102 | P6C | 274 | Validate system infrastructure requirements |
| 102 | P6C1 | 280 | Analyze current network/computing infrastructure |
| 102 | P6C2 | | Determine network/computing requirements for project |
| 102 | P6C3 | | Confirm and begin network/computing component acquisition |
| 102 | P6C4 | | Order and delivery of infrastructure components |
| | P7 | | MARKETING |
| 100 | P71 | | Participate in marketing procurement consulting engagement |
| 100 | P711 | 170 | Qualify potential client |
| 100 | P712 | | Qualify potential client e-Req/Cat |
| 100 | P713 | | Develop assessment statement of work (SOW) e-Req/Cat |
| 100 | P714 | | Develop assessment statement of work (SOW) |
| | P8 | | PROCESS |
| 102 | P81 | 156 | Customer process introduction |
| 102 | P811 | | Conduct customer introduction to Golden procurement and A/P processes |
| 102 | P82 | | Process reviews with customer - procurement and A/P |
| 102 | P821 | 344 | Review procurement processes with customer |
| 102 | P822 | 342 | Review A/P processes with customer |

TABLE 4-continued

CHART OF SUMMARY AND DETAIL TASKS

| Stage | Task ID | Step | Summary Tasks / Detail Tasks |
|---|---|---|---|
| 102 | P83 | | Assess customer impact on internal Enterprise workload |
| 102 | P831 | | Identify current and potential supplier catalogs for customer |
| 102 | P832 | 340 | Perform assessment of customer purchasing business |
| 103 | P84 | | Process alignment customer/Golden |
| 103 | P841 | | Determine GAPs between customer and golden processes |
| 103 | P842 | | Perform process GAP resolution |
| 103 | P85 | | BMP process and procedures management |
| 103 | P851 | | Codes and procedures |
| 103 | P852 | 348 | Update and review process management & procedures manual |
| 103 | P86 | | Supplier readiness |
| 103 | P861 | 210 | General supplier introduction |
| 103 | P862 | | Manage trading partner - EDI suppliers |
| 103 | P863 | 346 | Establish ASAP suppliers for customer (ASAP = a SAP supplier not requiring a buyer) |
| 103 | P864 | | Manage customer supplier outline agreements |
| 103 | P865 | | Customer freight procedures |
| 104 | P866 | | Supplier memo mailing |
| | P9 | | PROJECT MANAGEMENT |
| 102 | P91 | 180 | Initiate project planning |
| 102 | P911 | 160 | Confirm project scope and implementation strategy |
| 102 | P912 | | Confirm project organization and assign resources to roles |
| 102 | P913 | | Prepare and validate project plan and procedures |
| 102 | P914 | | Establish project team working environment |
| 102 | P915 | | Orient project team |
| 102 | P92 | 150 | Confirm and refine project management standards and procedures |
| 102 | P921 | | Confirm and refine issue management plan |
| 102 | P922 | | Confirm and refine project documentation |
| 102 | P923 | 152 | Confirm and refine quality assurance standards |
| 102 | P924 | | Create team building plan |
| 102 | P93 | | Confirm implementation strategies |
| 102 | P931 | | Confirm system configuration standards |
| 103 | P9311 | | Customize image offering |
| 103 | P9312 | | Validate and customize image core application change request |
| 103 | P93121 | | Refine and validate final customization for image |
| 102 | P932 | | Confirm CR/PTR process |
| 102 | P933 | | Confirm testing strategy |
| 102 | P934 | | Confirm production support & operations strategy |
| 102 | P935 | | Confirm SAP production system management strategy |
| 102 | P936 | | Confirm e-Req/Cat production system management stategy |
| 102 | P937 | 282 | Confirm network/computing strategy |
| 102 | P938 | | Confirm vendor conversion strategy |
| 102 | P94 | 162 | Prepare project team |
| 102 | P941 | | Conduct kick-off meeting |
| 102 | P942 | | Conduct project team standards meeting |
| 102 | P943 | | Conduct project team training |
| 102 | P95 | 352 | Define production support plans |
| 102 | P951 | | Define system management SAP resource requirements |
| 102 | P952 | | Define system management e-Req/Cat resource requirements |
| 102 | P953 | | Define production support accounts payable plan |
| 102 | P954 | | Define production support CSC plan |

TABLE 4-continued

CHART OF SUMMARY AND DETAIL TASKS

| Stage | Task ID | Step | Summary Tasks / Detail Tasks |
|---|---|---|---|
| 102 | P955 | | Define production support general procurement plan |
| 102 | P956 | | Confirm SAP system authorizations for project team |
| 102 | P957 | | Confirm Req/Cat access control list (ACL) |
| 102 | P958 | | Define system management image resource requirements |
| 102 | P96 | | Initial quality assurance review |
| 102 | P961 | | Initial QA review |
| 103 &104 | P97 | | Review project status and refine project plan |
| 103, &104 | P971 | | Conduct project team status meetings |
| 103 &104 | P972 | | Conduct steering committee meetings |
| 101 | P98 | | Obtain customer approval |
| 102 | P981 | | Won bid analysis/transition to implementation team |
| 102 | P982 | | Won bid analysis/transition to implementation team e-Req/Cat |
| 101 | P983 | | Conduct lost bid analysis |
| 101 | P984 | | Conduct lost bid analysis e-Req/Cat |
| 104 | P99 | | Validate production support |
| 104 | P991 | | Validate SAP production support for system management |
| 104 | P992 | | Validate production support for accounts payable |
| 104 | P993 | | Validate production support for CSC |
| 104 | P994 | | Validate production support for general procurement |
| 104 | P995 | | Validate Req/Cat production support for system managment |
| 105 | P996 | | Validate education & training production support activities |
| 104 | P9A | | Perform go live project office activities |
| 104 | P9A1 | | Ensure go live check lists activities |
| 104 | P9A2 | | Go/no-go decision for go live |
| 103 &104 | P9B | | Interim quality assurance reviews |
| 103 &104 | P9B1 | | Interim QA reviews |
| 105 | P9C | 244 | Post-implementation quality assurance review |
| 105 | P9C1 | | Post-implementation QA review |
| 105 | P9D | | Production support review |
| 105 | P9D1 | | Confirm production environment |
| | PA | | REQ/CAT |
| 102 | PA1 | | Identify customer responsibilities for Req/Cat |
| 102 | PA11 | | Identify country/global administrators & neg. con person |
| 102 | PA12 | | Perform country administrator education |
| 103 | PA2 | | Prepare and load Req/Cat catalog data |
| 103 | PA21 | | Perform Req/Cat catalogue tasks |
| 104 | PA3 | | Req/Cat production readiness |
| 104 | PA31 | | Confirm Req/Cat for production environment |
| 104 | PA32 | | Set up Req/Cat tables in production |
| 104 | PA33 | | Prepare Req/Cat production copy |
| 104 | PA34 | | Execute Req/Cat go live checklist |
| | PB | | SAP |
| 103 | PB1 | 254 | Conduct SAP functional detailed fit gap analysis |
| 103 | PB11 | 250 | Confirm SAP organizational hierarchy |
| 103 | PB12 | | Define the SAP functional detailed fit |
| 103 | PB13 | | Resolve SAP functional gaps |
| 103 | PB2 | | Produce custom SAP programs |
| 103 | PB21 | | Develop and validate SAP custom programs |
| 103 | PB3 | 252 | Configure SAP offering |
| 103 | PB31 | | Confirm and refine implementation guide |

TABLE 4-continued

CHART OF SUMMARY AND DETAIL TASKS

| Stage | Task ID | Step | Summary Tasks / Detail Tasks |
|---|---|---|---|
| 103 | PB32 | | Confirm and refine SAP initial settings and organizational structure |
| 103 | PB33 | | Confirm and refine SAP end user authorization profiles |
| 103 | PB34 | | Refine and validate final SAP configuration |
| 103 | PB4 | | Customize SAP offering |
| 103 | PB41 | | Validate and customize SAP core application change request |
| 103 | PB42 | | Refine and validate final customization for SAP |
| | PC | | TESTING |
| 103 | PC1 | 256, 260, 322 | Perform preparation activities for testing (both Req/Cat and SAP) |
| 103 | PC11 | | Confirm and refine test case templates |
| 103 | PC12 | 258, 326 | Build comprehensive test plan |
| 103 | PC13 | | Develop test environment plan |
| 103 | PC14 | | Create test case specifications |
| 103 | PC15 | | Build/reuse test cases |
| 103 | PC16 | | Determine testing tools |
| 103 | PC17 | | Review and validate comprehensive test plan |
| 103 | PC2 | 216 | Perform comprehensive testing |
| 103 | PC21 | | Perform unit test |
| 103 | PC22 | 262 | Perform component test |
| 103 | PC23 | 264, 328 | Perform integration test |
| 103 | PC24 | | Administer network/computing performance monitoring |
| 103 | PC25 | 266, 330 | Perform system test |
| 103 | PC26 | 220 | Perform user acceptance test |
| 103 | PC27 | | Perform other required testing |
| 103 | PC271 | | Support comprehensive image testing |
| 103 | PC28 | | Support comprehensive e-Req/Cat testing |
| 103 | PC29 | | Support comprehensive SAP testing |
| 103 | PC2A | | Support comprehensive image testing |
| | PD | | TRANSITION MANAGEMENT |
| 101 | PD1 | 172 | Introduce transition management (assessment) |
| 101 | PD11 | 172 | Develop initial assessment of client |
| 101 | PD12 | | Provide transition management workshop presentation |
| 102 | PD2 | 154 | Model transition management (project preparation) |
| 102 | PD21 | | Provide transition management strategy |
| 102 | PD22 | | Evaluate cultural impact of solution |
| 102 | PD23 | 300 | Develop/confirm transition management plan |
| 102 | PD3 | | Develop communication plan (project preparation) |
| 102 | PD31 | 304 | Build/confirm campaign plan |
| 102 | PD32 | 302 | Update communications trategy |
| 102 | PD33 | | Deliver announcement/kickoff communication |
| 103 | PD4 | | Initialize transition management (design and development) |
| 103 | PD41 | | Create incentive/reward program |
| 103 | PD42 | | Assess supplier impacts related to transition management |
| 103 | PD43 | | Assess Enterprise support impacts related to transition management |
| 103 | PD44 | | Design detail go live material/activities |
| 103 | PD45 | 308 | Create policy changes |
| 103 | PD46 | | Identify/plan for security |
| 103 | PD47 | | Detail process transition plan |
| 103 | PD48 | 306 | Detail human resources plan |
| 103 | PD49 | | Detail employee relations plan |
| 104 | PD5 | | Ensure transition management activities (deploy) |
| 104 | PD51 | 350 | Ensure new process management system in place |

TABLE 4-continued

CHART OF SUMMARY AND DETAIL TASKS

| Stage | Task ID | Step | Summary Tasks / Detail Tasks |
|---|---|---|---|
| 104 | PD52 | 222 | Perform client readiness assessment |
| 104 | PD53 | | Perform transition management go live activities |
| 104 | PD54 | 240 | Manage human resources activities |
| 105 | PD6 | | Communication (support) |
| 105 | PD61 | | Thanks to users/suppliers |
| 105 | PD7 | | Validate transition management (support) |
| 105 | PD71 | | Monitor human resource issues |
| 105 | PD72 | | Assess effectiveness of transition management program |
| 105 | PD8 | | Perform post implementation survey (support) |
| 105 | PD81 | 242 | Administer post go live survey |
| 105 | PD82 | | Present and act upon survey findings |
| | PE | | NOT CATEGORIZED |
| 104 | PE1 | 200 | Perform go live process activities |
| 104 | PE11 | | Allocate buyer codes to commodities |
| 104 | PE12 | | Enter blanket orders |
| ... | PE2 | | Table template document |
| ... | PE21 | | Table template document |

Project Assessment 101

Referring to FIG. 3 in connection with FIG. 2, project assessment phase 101 follows pre-sales phase 100, during which marketing makes its initial contact with the prospective client, or customer.

After initial contact from marketing 118, the main thrust of Assessment Project 101 is to provide an integrated, cross-functional customer solution to the client. An assessment team is led by the Business Office 120, but requires input and participation from the project leaders of Architecture 122, Transformation Management 136, Business Process 112, EDI 114, and Application Development 116.

Assessment 101 begins with a complete review of the client_s current general procurement and accounts payable processes. This includes debriefing the initial marketing team 118, instructing the project leaders 126, and accumulating all other relevant data available about the client's processes, tools, and organizational structures. The Assessment Team then defines an integrated customer solution that covers technical, educational, and Human Resource issues.

The delivery of the Workshop is intended to present an overview of the customer solution, initiate discussions on process analysis and strategic implementation, and confirmation of the solution fit. Specific goals of a workshop phase within assessment stage 101 include the following:

(1) Prepare and deliver a presentation to the customer defining the service offering, including any essential documentation on the offering, and a demonstration of the end-user tool(s), as applicable.
(2) Collect area specific information and customer requirements on network process sourcing, procurement, accounts payable, and finance; and EDI, I/T, and transition management.
(3) Identify high level gaps in each such area.
(4) Identify additional high level requirements for new process support, and for conversion requirements, including requirements for commodity structure, account structure, vendor, and contracts.
(5) Identify interface requirements, including requirements for HR, cost center, catalogs, ledger, information warehouse.
(6) Validate accounting for project, appropriation, contract, job, tax reporting, currency, and check reconciliation.
(7) Identify requirements for network, EDI, testing, and application development including new reports, new interfaces, and new features.
(8) Assemble a high-level gap analysis.
(9) Create a high-level Customer Scope Document.
(10) Confirm the recommended solution.

At the completion of the workshop phase, the assessment team 106 convenes to develop and cost the final customer solution and proposal. At this time, the members of assessment team 106 assemble, understand, and validate the collected data; review standard proposal options with assumptions and identify items that apply to this client; create a draft of the proposal including scope, risk, schedule, and resources; review the draft with team and other project members to obtain sizing and costing information for each area; compile costing information to add to the proposal; and perform QA review of the system integration, application development, managed operations (including service delivery center (SDC), application IT, and Process Operations) proposals, and of the overall proposal.

The resulting proposal is delivered or presented to the client. Final Assessment activities include follow up query responses and, should the proposal be declined, a loss analysis. This loss analysis feeds back into assessment process 101 to improve its overall effectiveness and efficiency.

Referring to Table 4, summary tasks pertaining to assessment stage 101 are listed, together with included detail tasks. For each task, a template 440 or 520 is maintained in data base 70, and accessed by team 108 members and others through summary view 400 to track progress (including viewing, updating, sharing, and approving) during this assessment stage 101.

Project Preparation 102

Referring further to FIG. 3, project preparation stage 102 sets up the project, initializes detail planning, and models the plan for making the transition from the client's legacy system and process to the new system and process (or, offering).

A critical element of this stage is to ensure resources are assigned to transition management 136, both from the project implementation team 126 as well as from the client. During this stage the transition activities required for a smooth migration from the old client process and system to the new service offering are modeled. The result is a detailed transition management plan that is specifically designed for the client. Stage 102 tasks and deliverables include the following:

(1) Perform analysis on the client HR environment, including organization structure and relationships, labor relations, management, administration, and end user roles and responsibilities, and the general HR environment.
(2) Develop and approve the detailed transition management and communication plan.
(3) Update the client specific transition management strategy.
(4) Define the quality assurance (QA) process required to assure that a project conforms to documented standards and meets documented requirements. The purpose of this task is to confirm the quality assurance standards between Enterprise and the client, and identifies the tasks that are to be audited by the Enterprise Technical Center.

The QA review is a beneficial process for the project as it timely recognizes potential risk areas and reduces the possibility of project delays while achieving faster implementation, attaining low cost and increasing the customer's level of confidence. Deliverables of the QA review task include the following:

(1) Confirm and refine quality assurance standards with the customer.
(2) Confirm that technical requirements can be met.
(3) Confirm that business and financial measurements can be met.
(4) Confirm that the proposal is complete and the required processes have been followed.
(5) Establish QA schedule for the project.

Integration of all critical Enterprise and client team members provides the glue to assure a smooth project. By completing the detailed tasks within project preparation stage 102, the recommended implementation standards, procedures and strategies for the project are shared with the technical and business functional members of the project team as well as with the customer. All team members have input in this process, and understand the basic procedures, once they have been agreed to. These procedures, documented in summary and detail task templates listed in Table 4, include the following:

Configuration Standards
CR/PTR Process
Testing Strategy
Production Support and Operations Strategy
SAP System Management Strategy
Req/Cat System Management Strategy
Network Computing Strategy
Vendor Conversion Strategy Project Design and Development 103

Referring further to FIG. 3, project design and development phase 103 provides and documents in a database of templates referred to as a Playbook, the business controls, transformation management, and SAP and Req/Cat customization required for an integrated approach to a complete customer solution.

During this stage 103, business controls 132 provides a comprehensive process that identifies key control points and establishes detailed procedures to assure a quality installation. The deliverables include documentation, separation of duties, sensitive programs, logical access control, logging (audit trail), change control for tables, change control for programs, system testing, input controls, processing controls, error handling controls, output controls, balancing and reconciliation, vital records and disaster recovery, records management, reports, local area network (LAN), and country specifics, as described below:

(1) Documentation: an assessment of the quality and completeness of existing program documentation and a determination of the degree to which programs could be efficiently reconstructed if they were destroyed.
(2) Separation of duties: the duties of the programmer, computer operations, and user groups are reviewed to ensure that separation of duties problems do not exist. No one individual can control activities within a process (or any event in a string of events) in a way that permits errors of omission, or commission of fraud, theft, etc., to go undetected.
(3) Sensitive programs: controls must be in place to prevent unauthorized modification and/or use of the application.
(4) Logical access control: while programs are generally controlled by a site procedure, application data has a formal access control mechanism.
(5) Logging (audit trail): a logging mechanism is established to ensure the audit trail is correct.
(6) Change control (tables): a change control system is put in place to evaluate, justify and control changes to tables.
(7) Change control (programs): a change control system is put in place to evaluate, justify and control changes to programs.
(8) System Testing: system testing procedures are effectively planned and carried out to ensure that controls are successfully tested and documented.
(9) Input controls: to insure accuracy and completeness of information entering an application.
(10) Processing controls: controls are applied for entry of data into the computer application system that ensure accuracy and completeness of data during computer processing.
(11) Error handling controls: controls for error handling and reprocessing of transactions.
(12) Output controls: output controls ensure the integrity of the output data from conclusion of computer processing to delivery to the user.
(13) Balancing and reconciliation: verifies that procedures to reconcile output to input are effective.
(14) Vital records and disaster recovery: disaster recovery is designed to provide for the continuity or rapid system restoration of a business process immediately following a natural or man-made emergency or disaster.
(15) Records management: verify that information is managed with sound business practices and controls.
(16) Reports: verify that reports are distributed properly.
(17) Local Area Network (LAN): Refer to ITCS 201, "Security Standards for Local Area Networks and Distributed Computing."
(18) Country specifics: verifies that any questions particular to this specific country are completed.

Req/Cat is a requisition and catalog product designed, developed, and maintained by Enterprise for use in systems such as those developed in this stage 103.

SAP is an financial and accounting package which an enterprise or company may license for its own use and for its customers. SAP configurators that customize package programs to fit the needs of the client are provided for use during design and development stage 103. All other installations of SAP are "off the shelf", with the client changing its internal structures to fit SAP requirements.

Transition management is the most overlooked part of any implementation process. It is critical to address the corporate culture and personality at the earliest contact. Strategic and tactical plans may then be developed that guide the implementation through "Go Live" and for an agreed period thereafter. The purpose of transition management steps of the design and development stage 103 is to provide guidance to the development team members as they work with the client to institute policy changes that might be introduced as part of the implementation of the new process and system. Necessary changes to the legacy system are identified and a plan developed to announce and introduce changes in policy. Policy change includes key business rules that are part of the management system for purchasing and procurement. They may be associated with approval levels or procedural changes in the new system. The target is not the day to day operation but management decision and support systems that might be affected. The areas addressed include:

Measurements (old and new)
Management system
Approval levels
Supplier contacts and contracts
Reward systems
Incentive Plans
Security
Employee and user changes All of these areas require strategic and tactical planning that includes the following steps:

(1) Identify the current (legacy) system or process and compare it to the new process or system to be implemented to identify gaps.
(2) Develop specific recommendations for gaps between the legacy and the new system or process, identifying the level of sensitivity and whether or not action is required as part of the transition.
(3) Determine the announcement and transition (or, cut over) date for each action identified.
(4) Design a communications plan to build the message and media for communicating the changes to affected parties.
(5) Design a process transition plan to ensure the elements of change are integrated into the overall plan for the process.
(6) Determine how the policies must be modified according to new standards and procedures
(7) Determine what new policies and procedures will be implemented as part of the process and system.

Finally, integration of the above design and development stage 103 process steps along with the technical teams involved allow the delivery of a cross-functional solution under one unified and managed plan.

Project Deployment 104

Referring again to FIG. 3, project deployment phase 104 uses the Playbook to improve deployment of (1) quality, or application systems control and auditability (ASCA), (2) transition management, and (3) integrated project management systems and procedures.

1. Quality (ASCA)

A business controls team provides dedicated resources throughout the life cycle of the project. During the project development stage 103, this team has planned and executed an ASCA self-assessment that has covered an extensive list of technical, business, financial, and client issues. In this deployment stage 104, its members are responsible for managing an independent audit that will cover the same areas. The independent auditors then issue an acceptance position that is required before the client can "Go Live" with the new system and process. Deployment stage 104 activities include:

(1) Create the project plan for ASCA Review preparation activities.
(2) Determine which Enterprise organization will conduct the ASCA and business controls review.
(3) Prepare all ASCA documentation required for the review.
(4) Prepare all sub-process overviews and descriptions of process flow.
(5) Ensure the test plan includes those elements of the ASCA checks required to ensure business controls, separation of duties, and authorization matrices, data integrity and security.
(6) Create, update and complete all required documents of understanding (DOU's) & service level agreements (SLA's)
(7) Ensure the separation of duties matrix (SOD) is current at time of final review.
(8) Review all testing and obtain test approvals.
(9) Ensure all approvals have been obtained and signed approval forms available for ASCA Review. These include approvals for process ownership, ASCA requirements, self-assessment and system cutover.

2. Integrated Project Management

During this deployment stage 104, project manager 126 has the task to validate and confirm that all checklists and status are acceptable prior to Go-live. This includes the readiness of all aspects of the project, and once satisfied, a review is conducted and the customer's formal sign-off for Go-live is obtained. Status transition management and client readiness assessment and confirmation activities include verification that:

(1) No critical open issues exist in any area.
(2) All relevant aspects of readiness have been included in the status check.
(3) Network and computing performance testing is complete.
(4) System test is complete.
(5) User acceptance test is complete.
(6) System management production environment Go-live checklist is complete.
(7) Any needed CR's and PTR's have been generated.
(8) Production support is in place.
(9) Supplier readiness is reviewed and accepted.
(10) Service provider readiness is confirmed.
(11) Enterprise GP readiness is confirmed.
(12) Review of the compiled check information is completed.
(13) Customer sign-off on the Go-Live decision is obtained.

3. Transition Management

A transition management team prepares for the deployment, or "Go Live" of the client solution. During this deployment stage 104 in the project, virtually all technical problems are resolved and systems configured. The client is now ready to deploy and the human factors must be aggressively managed to assure a smooth transition from the legacy systems to the improved client solution. Transition management activities within deployment stage 104 ensure that organization, measurements, management, support, and labor relations functions are developed, explained, reviewed, understood, in place or on schedule, as appropriate.

(1) Organization: organizational changes for Go-Live, updated communications plans, feedback mechanism for persons displaced by changes in organization, and the new organization.
(2) Measurements: changes in measurement system, plan to cutover to the new measurements, and communications explaining the new measurements, including how they are derived, how they are used and their importance to the business.
(3) Management: changes in management or management responsibilities, communications explaining the changes in management structure, and why it is important to the clients' organization, the management chain and path for escalation of issues, normal business reports and their use.
(4) Support: support structure for both client and technical support.
(5) Labor Relations: activities associated with the loss of a job role, plan to notify the affected people, communication plan for providing information to remaining employees on the reasons for the changes and for fostering support for the new process.

Integration of the cross-functional teams to accomplish the deployment of the customer solution is facilitated by use of the system and data base structure of the preferred embodiment of the invention.

Ongoing Project Support 105

Referring further to FIG. 3, project support stage 105 enables project teams, all of which have continuing responsibilities with the client after "Go Live", to provide the required ongoing support. As with all other stages, integration of the teams through the use of the systems and methods provided by the invention, including transition management systems and methods, is greatly facilitated. It is a characteristic of the preferred embodiment that each of these areas has specific predetermined plans, actions and responsibilities, and these are audited and tracked through a GP/AP development and deployment system.

During support stage 105, transition management 136 delivers an approved detailed questionnaire with quality questions in a logical format that allows end-users to express their opinion and provide information that meets the survey objective. Support stage 105 includes a plan for communicating the survey results to the participants and taking action in response to the survey results. This stage also incorporates a continuing education plan for training new employees as well as continually updating the material so that reflects the latest version of the application.

The survey in stage 105 is structured to determine the end users' perception of the new system, system ease of use, response time from both the system and CSC (Customer Service Center), and customer knowledge level of processes and product. Results of the survey are compiled and presented to the client and Enterprise Management Teams along with action plans, time tables, expected results for approval, and implementation. A Lessons Learned document is reviewed with the project team and appropriate adjustments made for future engagements.

Project Manager 126 provides a quality function task after "Go Live". This task aims at checking the implementation of the EPS Offering to determine if anything needs special attention or focus. It is also the formal sign-off on the final delivery of the implementation by the customer. Its deliverables include:

(1) Customer accepts delivery of the EPS general procurement offering implementation and signs off.
(2) Action list on issues and CR/PTR's, if applicable.
(3) Formal transition of operational responsibility to operations 98 and support management 96.
(4) Preliminary business benefits evaluation.

The Req/Cat and SAP technical teams 128, 138 provide ongoing reviews and improvements to the client's process through the CR and PTR processes. These are formalized, documented processes with management controls to attain cost, schedule, and customer objectives.

As part of the new business process, support center 94 is established to provide long term assistance in any area of the application solution. This includes communication of feedback, real time application assistance, and special requests for problems concerning data.

It is the planned integration of these multi-functional teams that provides an innovative solution to the customer.

Representative Path Implementation of Project Preparation Stage 102

Figure 3B:
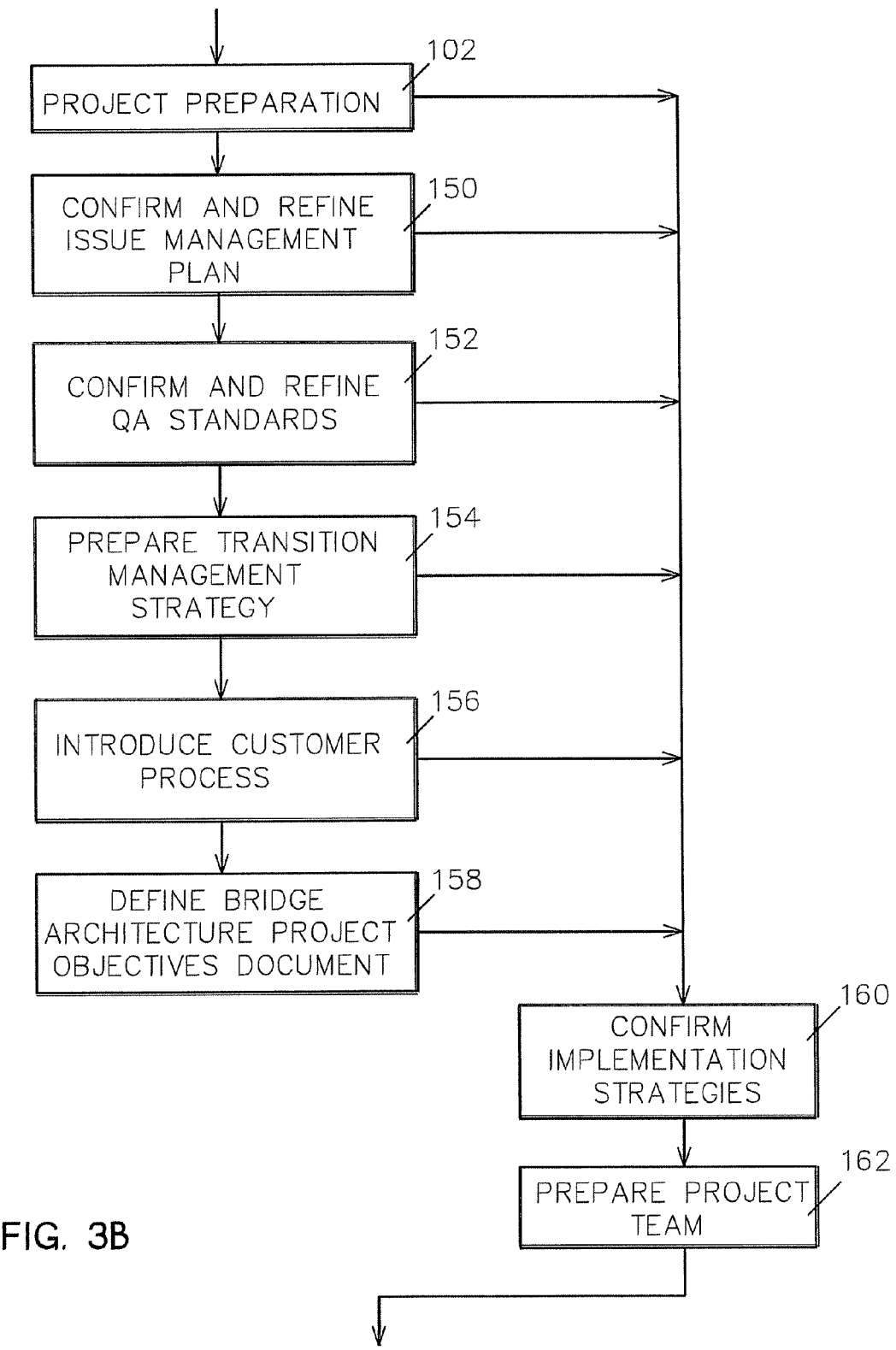
Figure 3C:
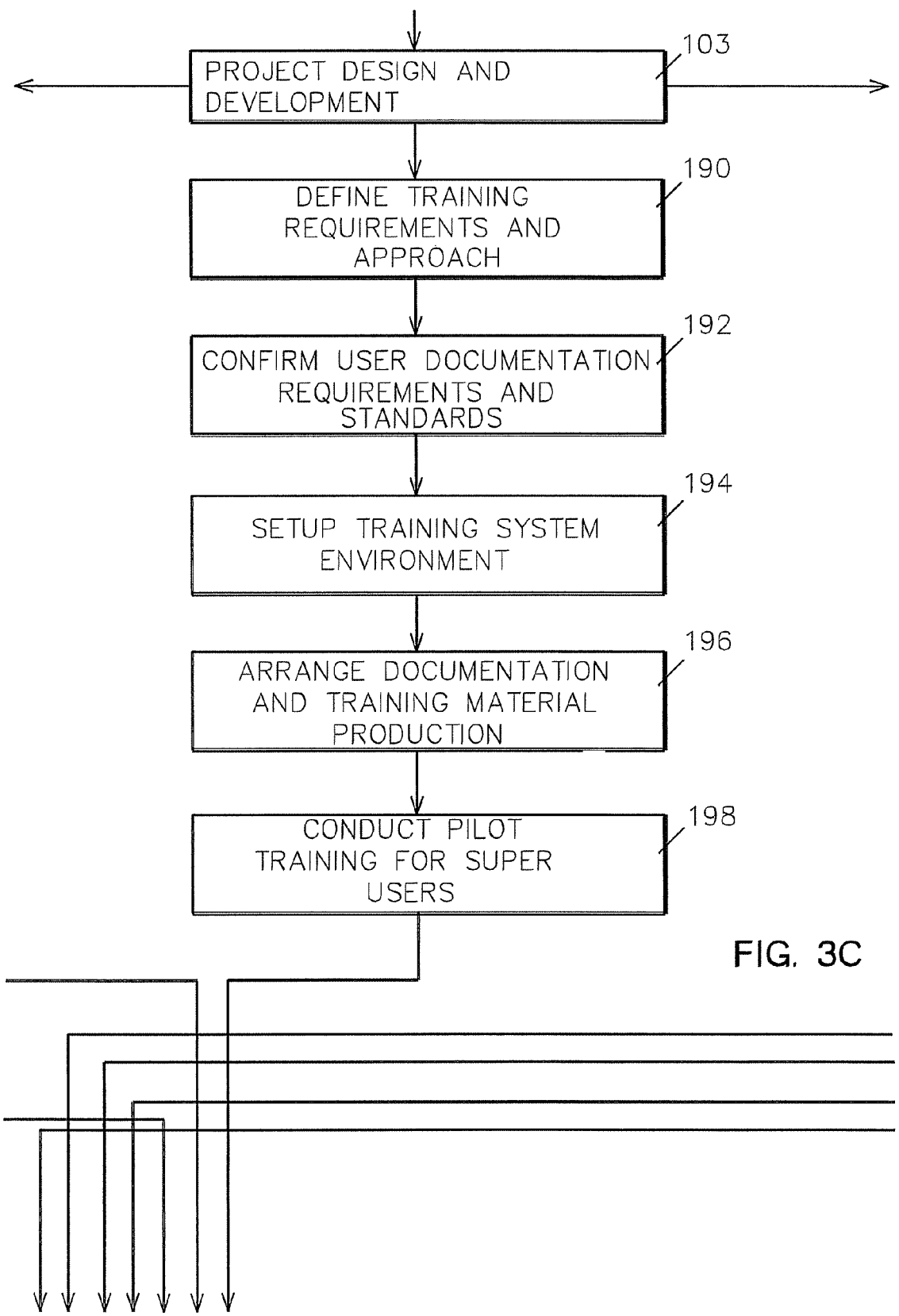
Figure 3D:
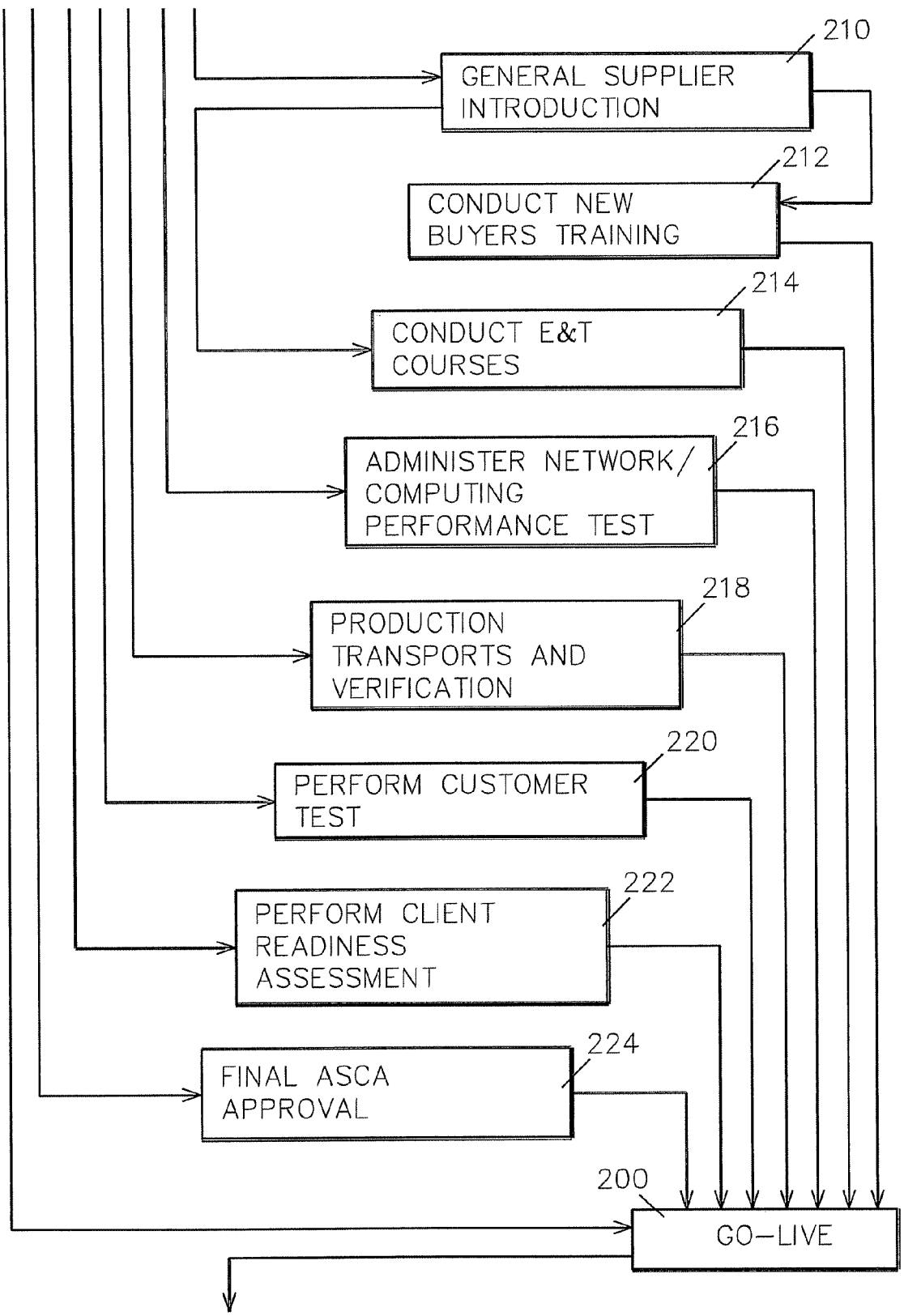
Figure 3E:
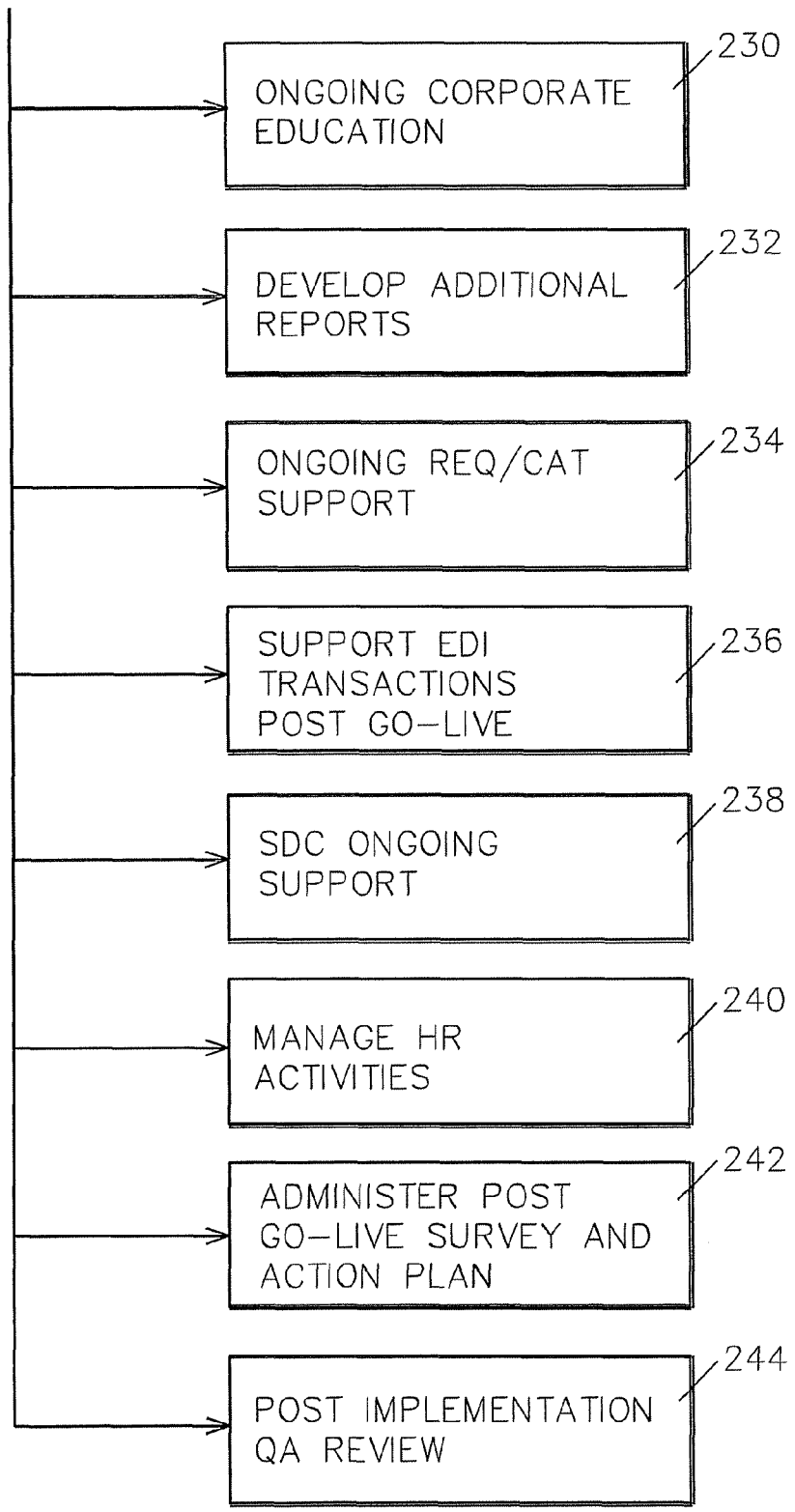
Figure 3F:
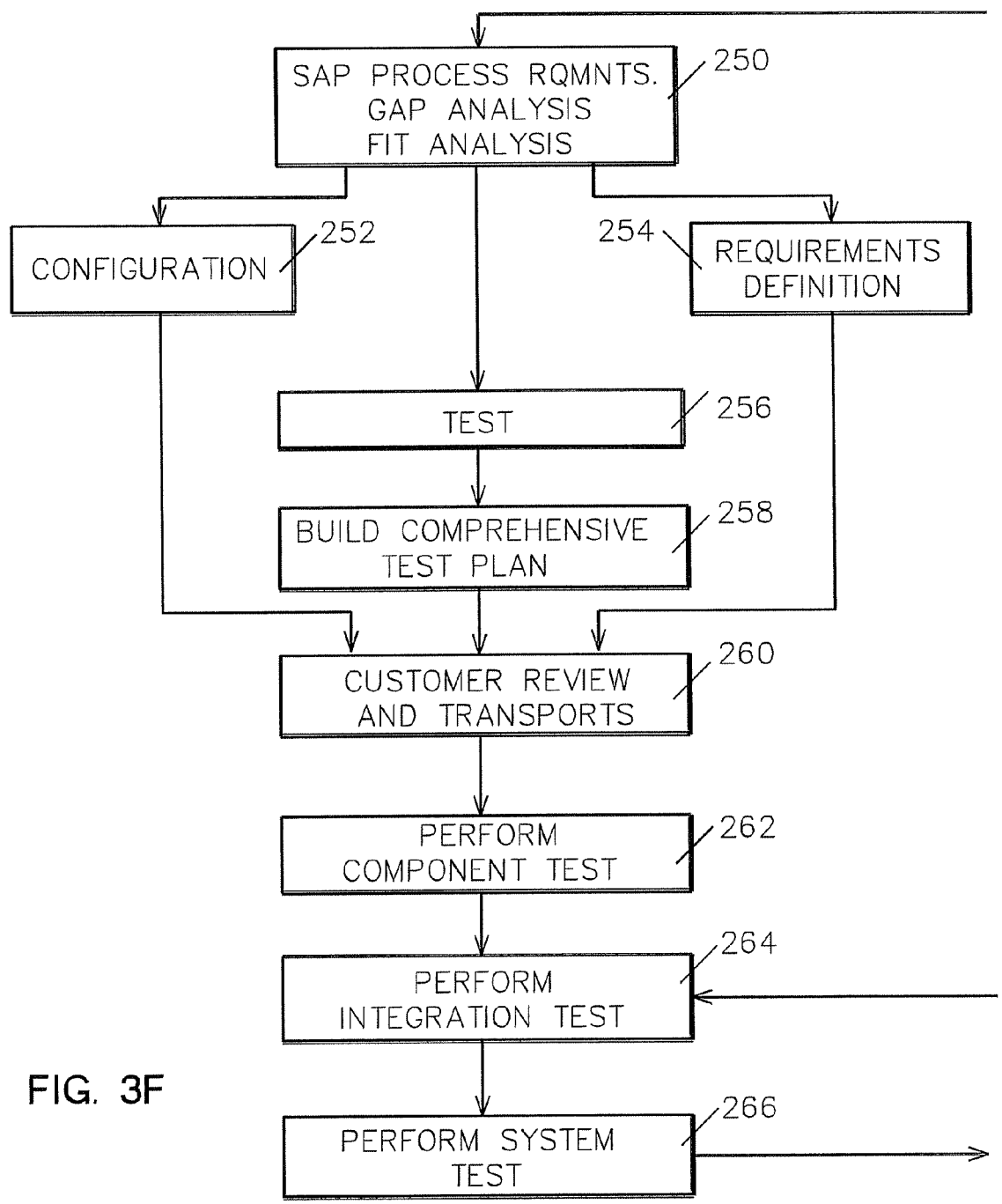
Figure 3G:
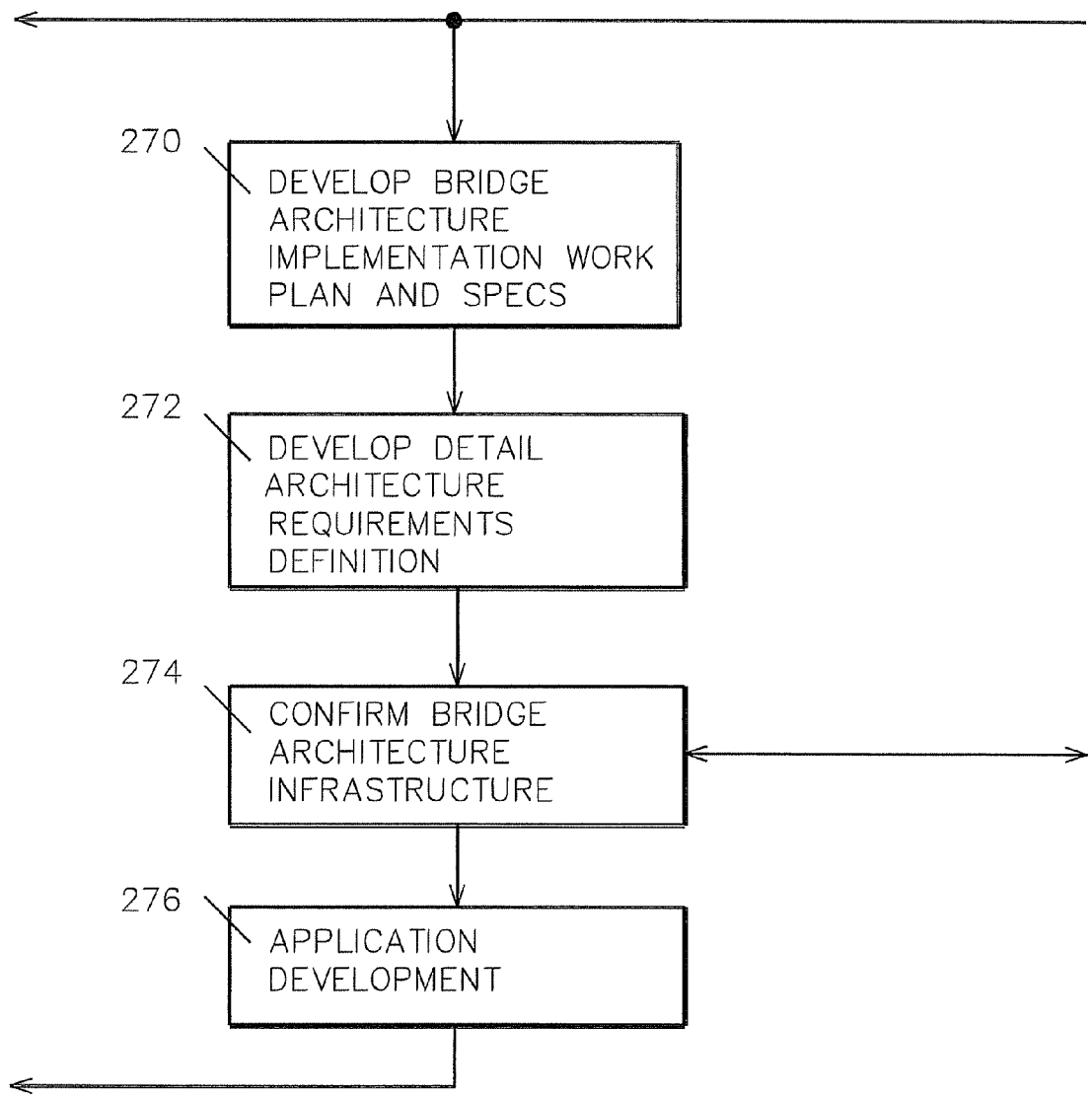
Figure 3H:
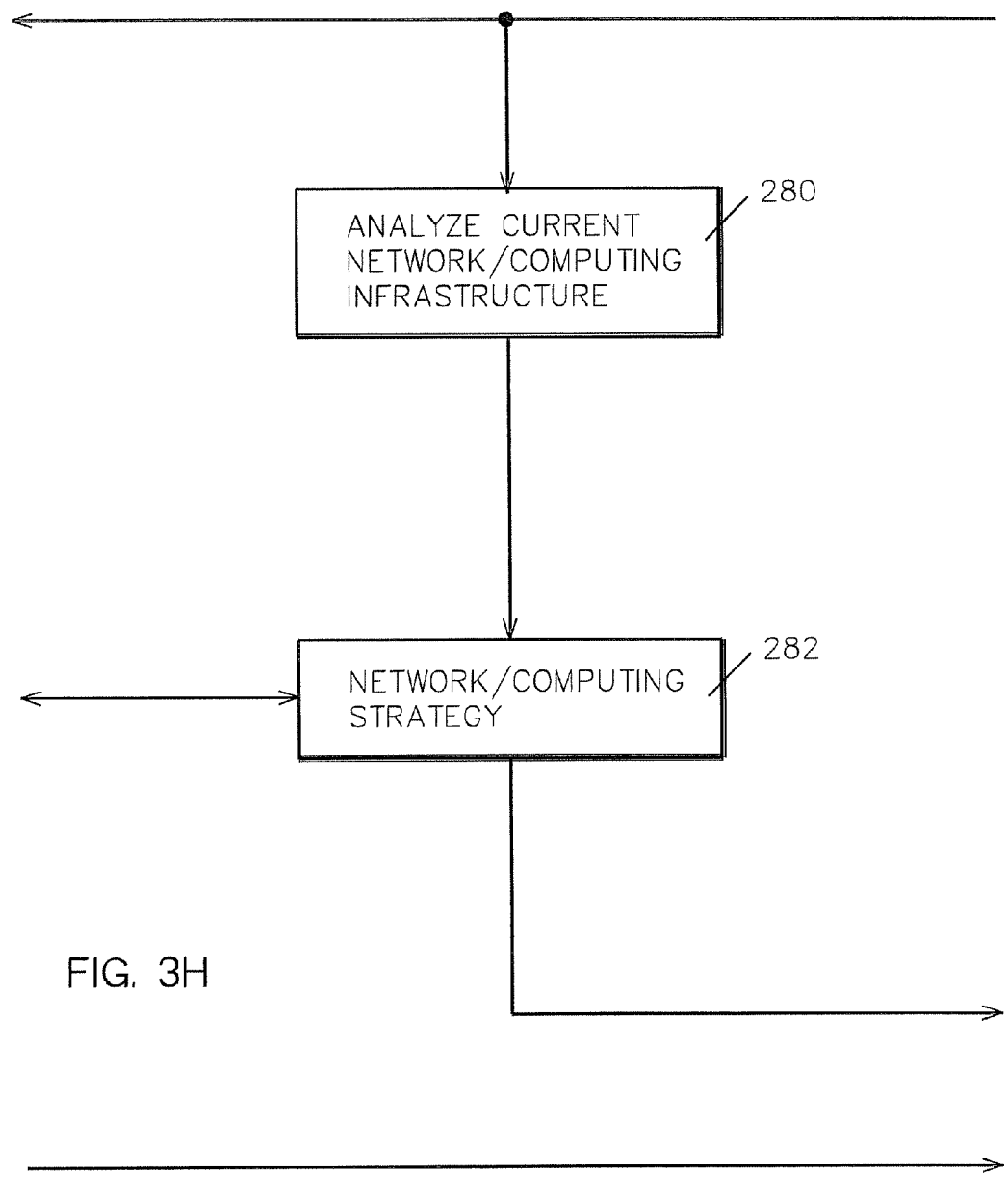
Figure 3J:
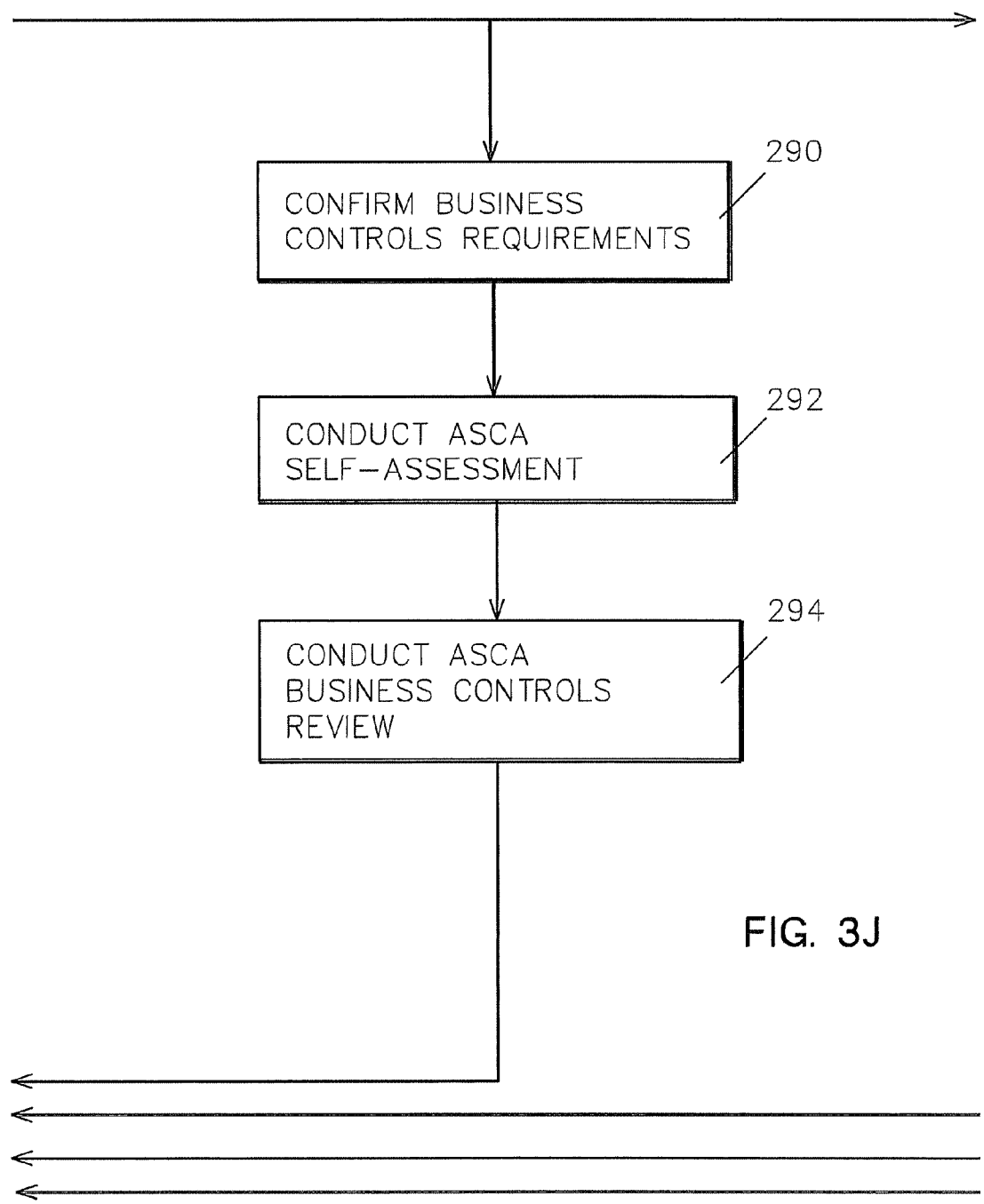
Figure 3K:
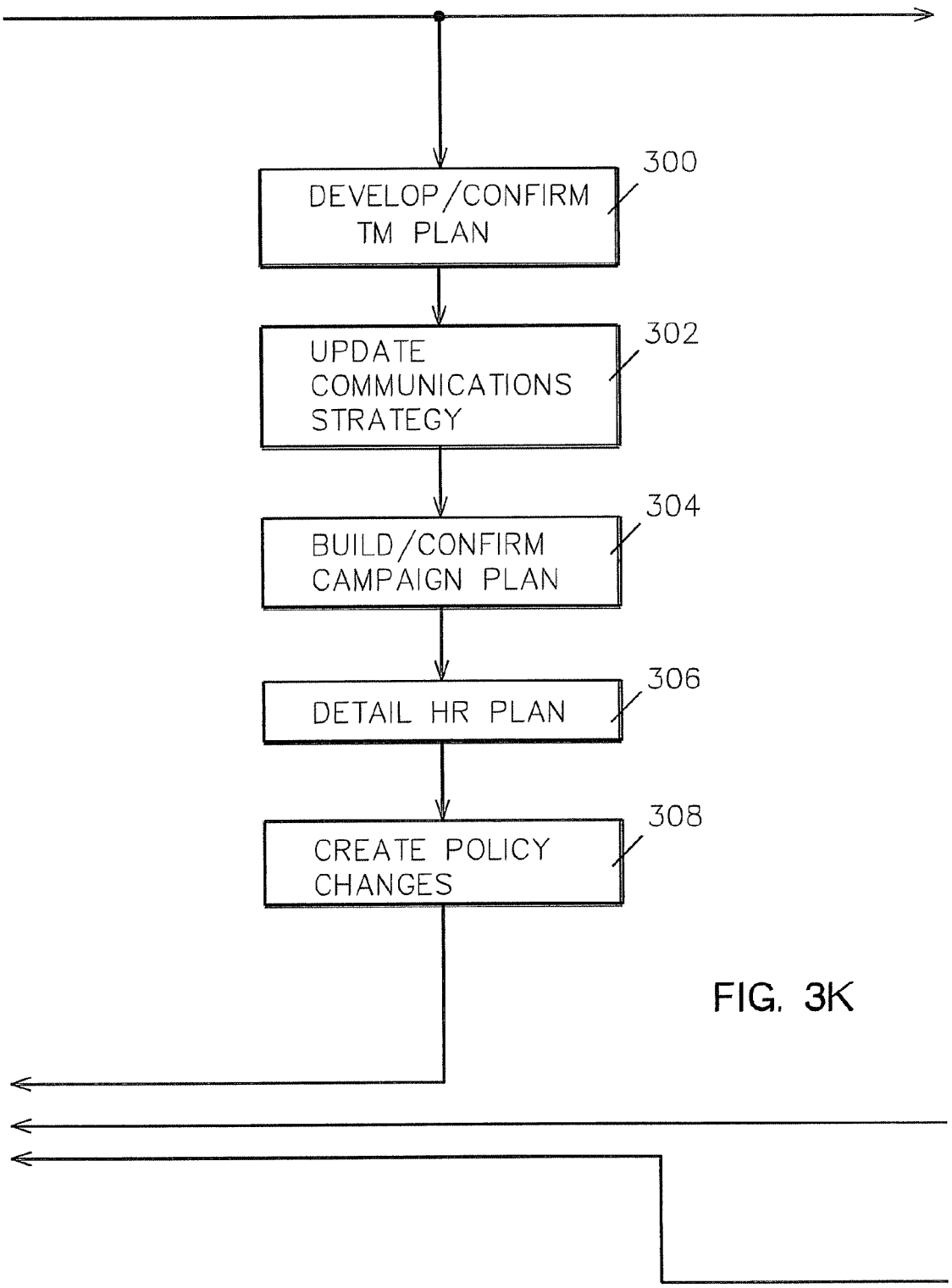
Figure 3L:
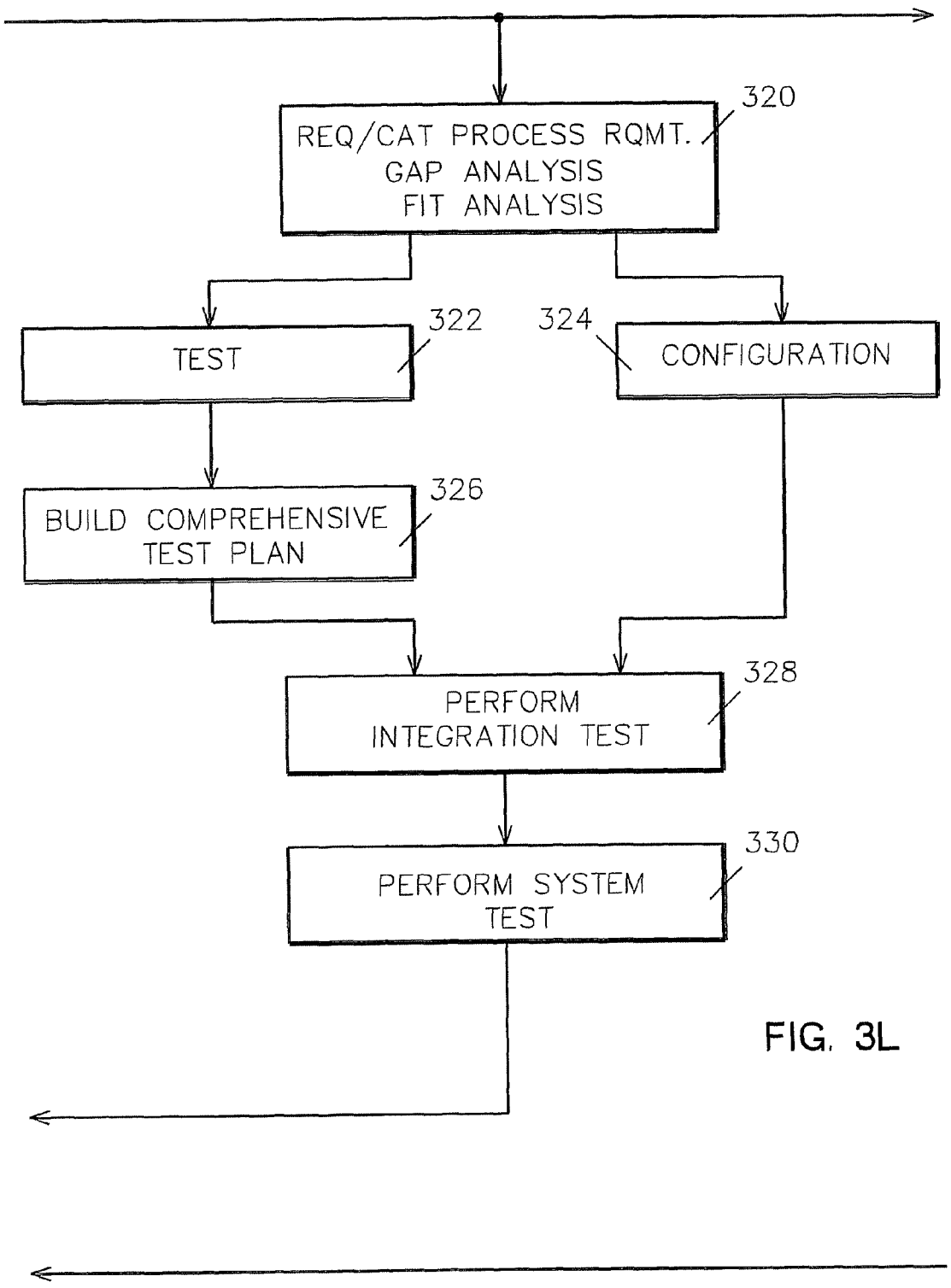
Figure 3M:
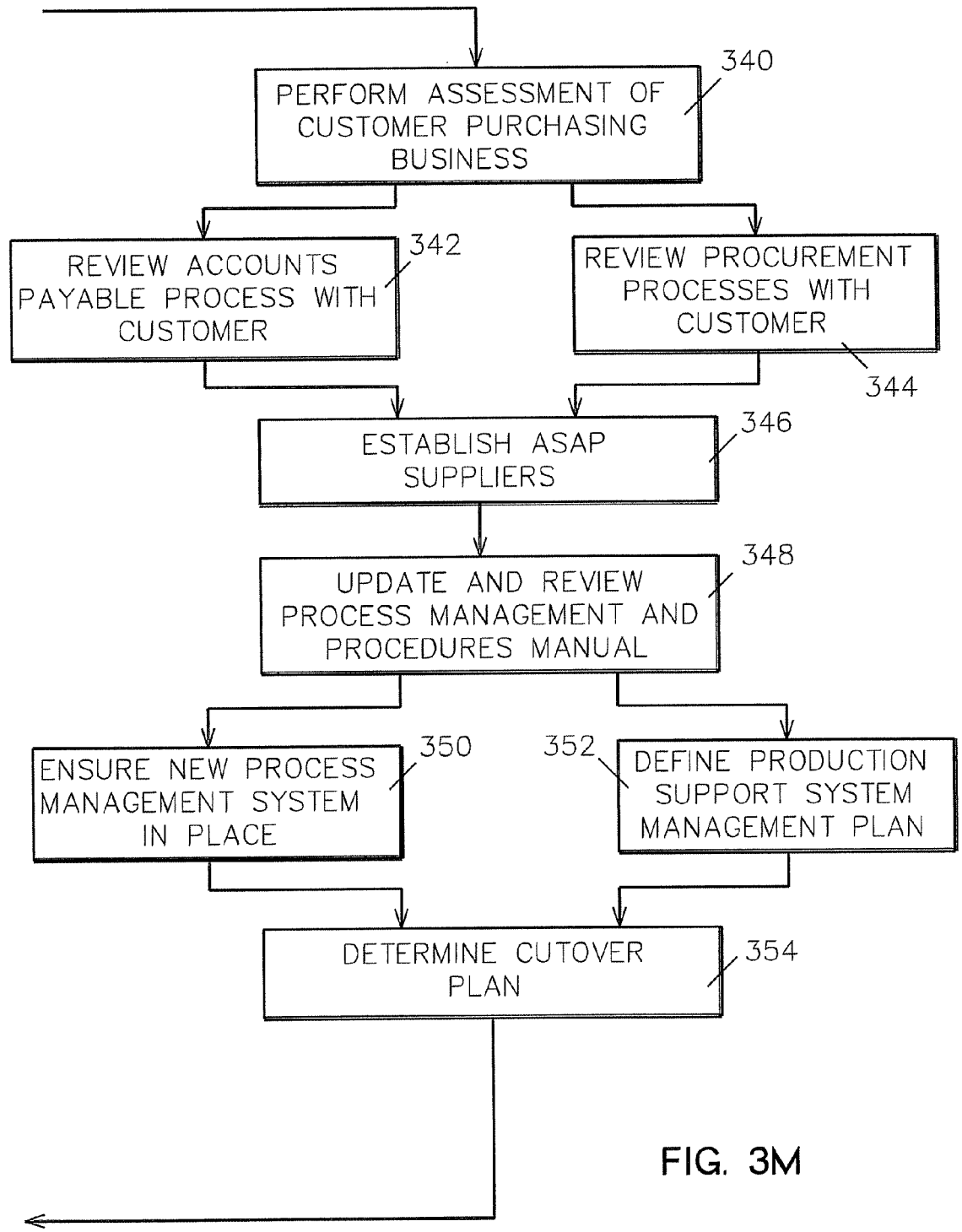

Referring to FIG. 3B, a series of steps illustrating an exemplary critical path through project preparation stage 102 will be described. In step 150, using summary task template P92, an issue management plan is confirmed and refined.

While these steps 150-162 represent a path through the preparation stage 102, other summary and detail tasks designated in Table 4 as pertaining to stage 102 are typically included in the initial set of templates for this customer, and are also used as they are determined to be applicable. Some field entries are dynamic and changeable during the course of project preparation stage 102. The templates are also editable for a particular project, and do not necessarily continue during use to conform to the original format.

In step 150, the project manager accesses summary task template P92 and its subsidiary detail tasks in the course of confirming and refining project management standards and procedures, including an issue management plan, project documentation, and quality assurance standards, and creating a team building plan. Template P92 provides, either directly or by way of links to other documents, instructions, flow charts, sample questionnaires, report models and checklists for guiding, coordinating and documenting the work of the project manager through the steps for doing so. Selected fields from template P92 are set forth in Table 9.

TABLE 9

SUMMARY TASK: CONFIRM AND REFINE PROJECT MANAGEMENT STANDARDS AND PROCEDURES

CREATION STATUS

| | |
|---|---|
| Category: | Project Management |
| Team: | Project Office |
| Offering type: | Req/Cat Implementation Only, SAP Implementation Only, Req/Cat & SAP Implementation |
| Stage: | 2. Project Preparation |

IMPORTANCE BUTTONS

| | |
|---|---|
| Education: | Yes |
| Certification: | Yes |
| Auditable: | Yes |
| Milestone: | Yes |
| Critical path: | No |

TABLE 9-continued

SUMMARY TASK: CONFIRM AND REFINE PROJECT
MANAGEMENT STANDARDS AND PROCEDURES

IMPLEMENTATION

| | |
|---|---|
| Executed by: | Service Provider |
| Performed by: | Project Manager |
| Priority: | High |
| Work effort: | 5 Days |
| Sequence: | Six Months Prior |

SUMMARY TASK DETAILS

Figure 9:
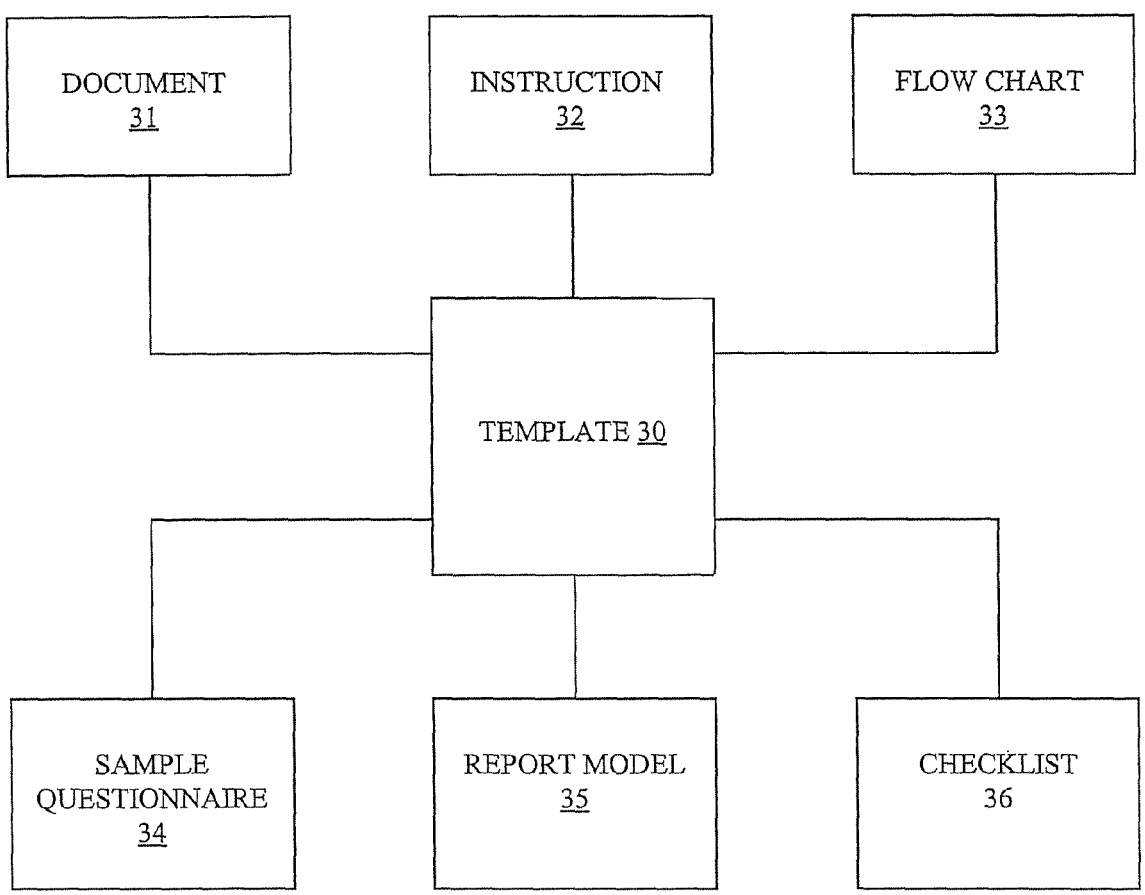
FIG. 9 depicts a template linked to a document, an instruction, a flow chart, a sample questionnaire, a report model, and a checklist, in accordance with the present invention.

Description:

The purpose of this summary task is to establish clear guidelines on the Standards and Procedures for the Project to be able to address key issues throughout the project implementation. The Issue Management Procedure outlines how open issues that affects scope, budget, timeline and resources are resolved. Project Documentation is necessary for tracking, controlling and monitoring a project by storing and maintaining the result of the project activities. The level of detail to be captured for each document must be agreed to in order to ensure consistency and data accuracy. Quality Assurance (QA) provides an independent and objective management review of the implementation project and identifies any risks to the project goals. The QA Standards assist the Customer Executive Management and Service Provider Project Manager in providing a second opinion of the implementation progress towards achieving the project goals. The scope of the review is to investigate the application, technical and project management areas of the implementation. The review looks for good project implementation practices. Implementations tend to be stressful, therefore Team spirit needs to be generated and maintained. It is important to take time out to relieve stress and recognize a job well done because motivation and inspiration always energize people. A Team Building plan must be created to schedule and arrange special events, and awards throughout the life of the project.
Assumptions:

Project scope and plan signed off by customer.
Prerequisites:

Project procedures (Technical Center Certification)
Critical success factors:

Adequate funding for team building activities
Strong discipline in project management standards and procedures
Deliverables:

1. Issue management procedure
2. Project documentation standards
3. Quality assurance standards
4. Team building plan In step 152, the project office accesses detail task template in the course of confirming and refining quality assurance standards. Template P923 provides, either directly or by way of links to other documents, instructions, flow charts, sample questionnaires, report models and checklists for guiding, coordinating and documenting the work of the project office through the steps for doing so, as set forth in Table 10. See, e.g., FIG. 9 which depicts a template 30 linked to a document 31, an instruction 32, a flow chart 33, a sample questionnaire 34, a report model 35, and a checklist 36, in accordance with the present invention.

TABLE 10

SUMMARY TASK: CONFIRM AND REFINE QUALITY
ASSURANCE STANDARDS

CREATION STATUS

| | |
|---|---|
| Category: | Project Management |
| Team: | Project Office |
| Offering type: | Req/Cat, SAP, Req/Cat & SAP |
| Stage: | 2. Project Preparation |

IMPORTANCE BUTTONS

| | |
|---|---|
| Education: | Yes |
| Certification: | Yes |
| Auditable: | Yes |
| Critical path: | No |

IMPLEMENTATION

| | |
|---|---|
| Executed by: | Service Provider |
| Performed by: | Project Manager |
| Priority: | Medium |
| Work effort: | 1 days |
| Sequence: | Six Months Prior |

SUMMARY TASK DETAILS

Description:

Quality Assurance (QA) is defined as the process required to assure that a project conforms to documented standards and meets documented requirements. As such, the focus lies heavily on overall project management rather than on assurance of specific project deliverables. The latter falls under Software Quality Assurance (SQA). The purpose of this task is to confirm the Quality Assurance Standards between the Service Provider, Enterprise and the Client, including the identification of tasks auditable by the Enterprise Technical Center. The QA Review is a beneficial process for the project as it timely recognizes potential risk areas, reduces possibility of extended project timeline while achieving faster implementation, attaining low cost and increasing the Customer's level of confidence.
Prerequisites:

Project Procedures (Technical Center Certification)
Task Steps
Confirm and Refine Quality Assurance Standards with the Customer
Setup QA schedule for the project
Develop customer presentation
Review with Customer and obtain acceptance
Agree with customer time and audience for review of Quality Assurance Standards
Conduct review with customer and obtain acceptance of Quality Assurance Standards
Deliverables:

Agreed quality assurance standards for the project

In step 154, the transition management team, accesses summary task template PD2 and its subsidiary, or drill down, detail tasks, in the course of preparing a transition management strategy. Once the perspective client has signed the contract, Preparation Stage 102 is ready to begin. The purpose of the Preparation stage is to setup the project, initialize detail planning, and model the plan for making the transition from the legacy system and process at the client site to the new services process. The critical element of this stage is to ensure resources are assigned to transition management, both from the project implementation team as well as from the client. In addition, there are a series of analysis worksheets to be completed that provide a framework for developing the final transition management plan that will be used in conjunction with a specific client. Finally, the objective of this stage is to "model" the transition activities required for a smooth migration from the old client process and system to the new service offering. The result will be a detailed Transition Management Plan that is specifically designed for the client. Key activities within the Preparation stage include: assign resources to the transition management effort, perform analysis on the client HR environment develop, and gain approval for the detailed transition management plan. Template 154 provides, either directly or by way of links to other documents, instructions, flow charts, sample questionnaires, report models and checklists for guiding, coordinating and documenting the work of the assessment team through the steps for doing so. The resulting deliverables are an updated and client specific Transition Management Strategy, updated input to the Client Transition Management Plan, a complete HR Analysis checklist, including organization structure, organization relationships, management job roles & responsibilities, administration job roles & responsibilities, process/end user job roles & responsibilities, labor relations, general HR environment, and an approved Transition Management Plan.

In step 156, assuming that the assessment stage has resulted in a customer contract, the accounts payable analyst, assisted by the ledger expert, accesses summary task template P81 and its subsidiary detail task templates in the course of introducing the customer to the process. This introduction is intended to provide the customer with an overview introduction to the Golden Procurement and Accounts Payable processes. It is a prerequisite for the following detailed review of the individual Procurement and Accounts Payable processes. Template P81 provides, either directly or by way of links to other documents, instructions, flowcharts, sample questionnaires, report models and checklists for guiding, coordinating and documenting the work of the analyst. The results are the development and delivery to the customer of a customer specific procurement and accounts payable process presentation, including a customer specific EPS procurement presentation by the procurement analyst, a procurement process presentation by the procurement analyst, a customer specific EPS accounts payable presentation by the accounts payable analyst, and an accounts payable process presentation conducted for the customer by the accounts payable analyst.

In step 158, the architecture team, supported by Application Developer 116, Business Controls Analyst 132, Configurator, Customer 68, Network Architect, and Req/Cat 128, accesses detail task template P642 in the course of defining a bridge architecture project objectives document. An E-Req/Cat bridge identifies each interface into and out of E-Req/Cat. A SAP bridge identifies each interface into and out of the SAP system and current application extensions. Template P642 provides, either directly or by way of links to other documents, instructions, flow charts, sample questionnaires, report models and checklists for guiding, coordinating and documenting the work of the architecture and supporting teams. Table 11 illustrates selected fields from sample detail task template P642. A table is also provided to track the completion by the architect 122 of each step, including (1) update baseline documentation, (2) review SAP & e-Req/Cat bridge architecture, (3) document bridge architecture assumptions, (4) compile information, and (5) obtain POD sign off.

TABLE 11

| DETAIL TASK: DEFINE BRIDGE ARCHITECTURE PROJECT OBJECTIVES DOCUMENT | |
|---|---|
| CREATION STATUS | |
| Category: | I/t |
| Team: | Architecture |
| Offering type: | Req/Cat, SAP, Req/Cat&SAP implementation |
| Stage: | 2. Project preparation |

TABLE 11-continued

| DETAIL TASK: DEFINE BRIDGE ARCHITECTURE PROJECT OBJECTIVES DOCUMENT | |
|---|---|
| IMPORTANCE BUTTONS | |
| Education: | Yes |
| Certification: | Yes |
| Auditable: | Yes |
| Critical path: | Yes |

DETAIL TASK DETAILS

Description:

The task objective is to understand the information resources relevant to this project, collect detail information to complete diagrams and text that describe the client's current and future environment, compile the information and compare to pre defined requirements for the chosen service offering. From this information the high level gaps will be realized and preliminary resolutions can be determined and documented.
Much information is available from many sources. Some clients may have developed a technical architecture containing installation standards for systems and application designs. Therefore, organize this information into a format useful for the system design, and ensure it is complete and well understood. Use this documentation to ensure that a common understanding of the requirements exists among the designer, the client, and other parties.
    Review documentation collected in the Assessment stage
    Understand the current information technology
    infrastructure
    Update architecture documentation
    Identify the information technology rules that the
    system must obey
    Identify end users and end-user functions, and group
    them
    Identify the relationships of the business processes
    to the end users
    Identify the technical services that are required
    by each end-user function group
    Identify end-user function groups and required network
    services by location
    Document system management requirements
    Document requirements not covered specifically by
    the above
    Identify how the system will be evaluated by the client
    Assess possible cost constraints and benefits
    Document assumptions, issues, and questions
    Identify and document gaps and resolutions
Prerequisites:

Work Sessions have been held with Customer - Baseline documentation has been initiated from these work shops
Task steps:

1. Update Baseline Documentation - The bridge architecture baseline documentation was collected in a draft format from the detail work sessions in the Assessment stage of the project, this documentation should be updated based on information gained from interlock sessions with the SAP and Req/Cat configuration teams.
Update SAP bridge architecture baseline
    Validate with SAP configuration team
        Identify configuration dependencies
        Resolve conflicts between SAP configuration
        constraints and bridge requirements
    Validate with Business Operations staff
        Obtain concurrence on business operations roles
        and responsibilities
Update E-Req/Cat bridge architecture baseline
    Validate with E-Req/Cat architecture and design teams
        Identify configuration dependencies
        Resolve conflicts between e-Req/Cat
        configuration and design constraints and bridge
        requirements
    Obtain copy of e-Req/Cat system architecture from
    architecture team TABLE 11-continued

DETAIL TASK: DEFINE BRIDGE ARCHITECTURE PROJECT OBJECTIVES DOCUMENT

Develop bridge description matrix
    Define all SAP bridges
        Bridge names
        IFDT Names
        IP Addresses
            Production
            Test
    Define all e-Req/Cat bridges
        Bridge names
        Data type names
        IP Addresses
            Production
            Test
Document network traffic estimates
    Bridge transmission frequency
    Average file size
    Average number of records per file
    Project file size growth
    Assumptions
2. Review SAP & e-Req/Cat Bridge Architecture - All documentation must be reviewed with the respective team members for confirmation and validation.
Network Architect
    For each bridge
        Transmission protocols to be used
        IP addresses of all systems
        Network traffic estimates
        Obtain copy of network architecture
Business Controls
    For each bridge review and obtain concurrence
        Control points
        Data flows (cross platform communication)
Systems Management & Test teams
    Validate assumptions on SAP landscape
    Identify additional hardware and software required
    Preliminary workload assessment for each team
3. Document Bridge Architecture Assumptions - For each bridge and application extension provide a brief description containing:
Functional Overview
Are existing applications to be used
Will existing applications require change
    Briefly describe changes
Will new applications need to be developed
4. Compile information - Information collected in the previous step must be compiled and placed in a manageable format to document the scope of the project from a Bridge Architecture perspective.
Complete the POD with the following information:
Bridge Architecture Inventory
Bridge Definition Matrix
Bridge Architecture Assumptions & Guidelines:
    Hardware/Software
        SAP Landscape - IGS SDC
        SAP Release Level - IGS SDC
        Req/Cat Staging Server - Req/Cat AD
        Currency Exchange Rates Server - Architect
        Fax Server - IGS SDC
Control Data and Master Data (SAP & E-ReqCat)
    For Example:
        Chart of Accounts - SAP/E-ReqCat Customization
        Cost Center Updates to SAP Inbound Interface (IP) - SAP Customization
        Vendor Data Conversion - Vendor Group
        Vendor Cross Reference File - Vendor Group
        Currency Exchange Rates - Architect
        PO Data Conversion from different versions of SAP (Optional) - SAP Customization
        HR Extract (E-ReqCat)
Bridges (SAP Bridges & E-ReqCat)
    For Example:
        Requisition & Catalog System - Req/Cat AD
        EDI Processing - EDI
        Non-PO Invoice Processing - AP Operations
        AP Image Outbound Interface - AP Operations
        Goods Receipt Processing - GP Operations/SAP Customization
        Check Payments Outbound Interface - SAP Customization/ AP Operations
        Positive Pay Outbound Interface - SAP Customization/ AP Operations
        Check Recon Inbound Interface - SAP Customization/ AP Operations
        Duplicate Payment Audit Outbound Interface - SAP Customization/AP Operations
        Accounting Data Reclassification Inbound Bridge from CLS (IP) - AP Operations
        Ledger Outbound Interface (IP) - AP Operations
        IRS 1099/1042 Reporting (IP) - AP Operations
        BDW Outbound Interfaces (IP) - Customer
        SAP Document Archiving - GP Operations/AP Operations
Application Extensions
High level description of the current hardware and software systems
High level description of the networks that link them
Present the completed POD and associated Bridge Architecture diagrams to the Project Manager for inclusion in the Project Definition Deliverables to be reviewed with the Customer
5. Obtain POD Sign Off - The POD should be reviewed with the Customer Representative and the Enterprise Procurement Services Process Owner and each must approve by signing the document.
Deliverables:
Validated SAP & e-Req/Cat Bridge Architecture
SAP Landscape & e-Req/Cat System Architecture
Network Architecture & Network Sizing
Bridge Description Matrix
Completed/Signed I/T Project Objectives Document (POD): This document defines the Application Architecture that will be implemented for the selected service offering. The Application Architecture identifies all of the Interfaces (Bridges) between inbound/outbound systems and all of the Application Extensions required to support the General Procurement and Accounts Payable Business processes.
Infrastructure Requirements Specification: Gathers all the relevant requirements that influence the infrastructure design for each integration point and gap, as input to the subsequent design tasks.
    Business Environment
    Information technology environment
    Users, processes, data
    Service levels
        Capacity and performance
            Availability
            Security
        System Management
        Viability
            Reasonableness
            Risk
            Issues and Assumptions
Architecture Overview: A reconciled view of the Future Logical Data and Future Logical Process Models representing the total set of applications, information systems, manual systems, management systems, procedures, organizational structures, objectives, and goals that will make up the business system in the future. It represents the scope of the project effort and, in general, it consists of an integrated process and entity model.
The business model is used to describe the future task flow for the new business system as defined in the business model to determine the effectiveness of the business solution or business system. The business model is also used to capture and document the design decisions made as a result of reviewing the scope of the new business system, business needs and trends, and the objectives and constraints.
Methodology attachments:

The following document links will provide the attachments necessary to complete this task:
Project Objectives Document =>
Network Sizing Document =>
Initial Baseline documentation created in Perform Bridge Architecture Integration Point Interfaces Work Session see the

TABLE 11-continued

DETAIL TASK: DEFINE BRIDGE ARCHITECTURE PROJECT OBJECTIVES DOCUMENT

Project Attachments field within the Project Reference Area
Section =>
PROJECT REFERENCE AREA In step 160, the project office team 126 accesses detail task template P911 in the course of confirming project scope and implementation strategy. The purpose of this task is to confirm the project scope and implementation strategy including assumptions agreed upon during the assessment phase. This includes development of detailed project plan with specification of deliverables. Any changes applied to the project scope, implementation strategy and deliverables after sign-off will be managed via Change Requests. It is also important to review and agree on the assumptions that the scope and implementation strategy is based on. Any changes to assumption made in the assessment phase can lead to changes in scope and potentially implementation strategy as well. Once the scope and implementation strategy is agreed upon a Key Milestone Plan can be developed outlining the main deliverables for each phase and the associated costs. Template P911 provides, either directly or by way of links to other documents, instructions, flow charts, sample questionnaires, report models and checklists for guiding, coordinating and documenting the work of the project office team through the steps for doing so, including (1) reviewing and confirming project scope based on an engagement assessment or contractual agreement with the customer, (2) reviewing and confirming the implementation strategy, developing a key milestone chart, obtaining the customer approval of project scope, cost, key milestones and implementation strategy, and reviewing with key team leads to prepare project plan and resource assignments.

In step 162, the project manager team 126 accesses summary task template P94 and selected subsidiary detail task templates in the course of preparing the project team. The purpose of this task is to ensure the implementation team is knowledgeable of the project approach and responsibilities, and ensure Team members possess the skills required to perform the tasks. The prerequisites are completion of the implementation strategy, project organization, project plan, and project scope. The Project Manager reviews the project scoping document and prepares a presentation of scope, business requirements and project goals to ensure that the project team have sufficient knowledge of the project plans. The Kick-off Meeting formally announces the initiation of the project; Consultants, Steering Committee, Senior Management, Project Managers from the Customer and service provider must be involved. Template P94 provides, either directly or by way of links to other documents, instructions, flowcharts, sample questionnaires, report models and checklists for guiding, coordinating and documenting the work of the project manager team.

Advantages over the Prior Art

It is an advantage of the invention that there is provided a system and method for evaluating a client_s general procurement and accounts payable (GP/AP) system.

It is an advantage of the invention that there is provided an optimized solution for out-sourcing procurement of goods and services.

It is an advantage of the invention that there is provided a system and method for training service providers.

It is an advantage of the invention that there is provided a system and method for managing service providers to assure quality of service.

It is an advantage of the invention that there is provided a system and method for managing a project.

It is an advantage of the invention that there is provided an optimized general procurement and accounts payable system characterized by lower costs, a paperless process, and more comprehensive service with a shorter cycle time.

ALTERNATIVE EMBODIMENTS

Figure 7:
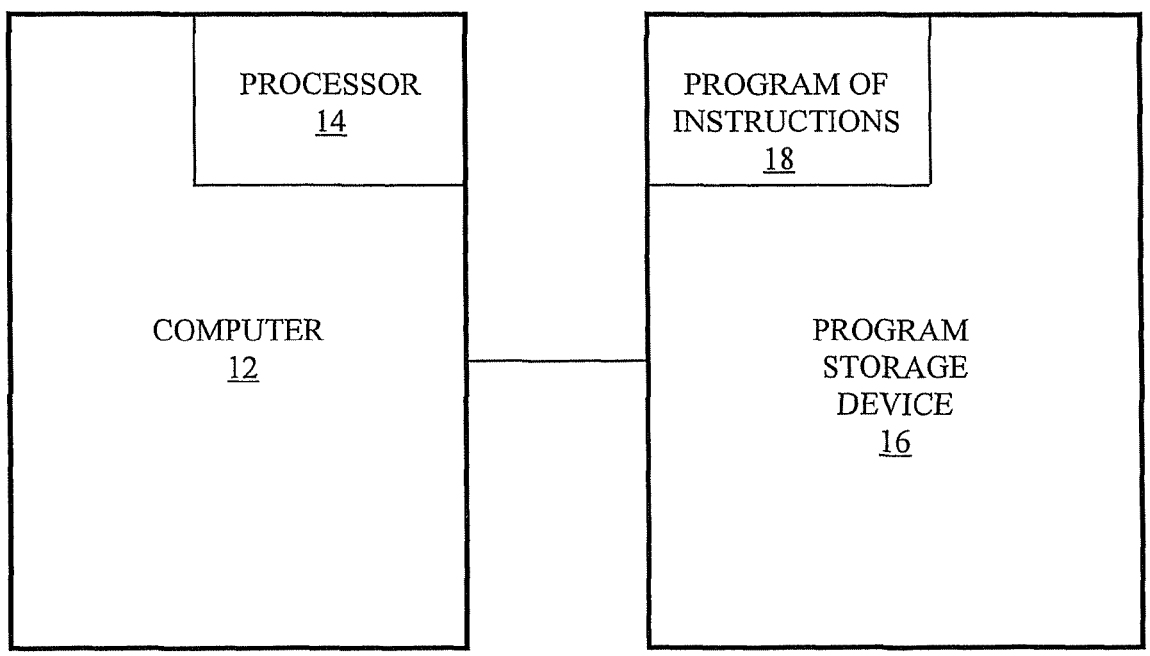
FIG. 7 illustrates a program storage device coupled to a computer, in accordance with the present invention.

It will be appreciated that, although specific embodiments of the invention have been described herein for purposes of illustration, various modifications may be made without departing from the spirit and scope of the invention. In particular as shown in FIG. 7, it is within the scope of the invention to provide a computer program product or program element, or a program storage or memory device 16 such as a solid or fluid transmission medium, magnetic or optical wire, tape or disc, or the like, for storing signals readable by a machine, for controlling the operation of a computer 12 according to the method of the invention and/or to structure its components in accordance with the system of the invention.

Further, the program storage or memory device 16 includes a program of instructions 18 such that each step of the method may be executed by executing the program of instructions 18 on a processor 14 of the computer 12, such as an IBM System 390, AS/400, PC or the like, said program of instructions 18 being one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module such as the processor 14 designed for that purpose.

Accordingly, the scope of protection of this invention is limited only by the following claims and their equivalents.

We claim:

1. A system comprising a computer configured to execute a program of instructions stored on a program storage device to perform a method for coordinating a project for designing, implementing, and using a general procurement and accounts payable (GP/AP) system for a customer, said method comprising:

creating a playbook database, said playbook database comprising a plurality of templates of information relating to said designing, implementing, and using said GP/AP system, said plurality of templates being particularized for the customer;

generating a playbook summary view from said playbook database;

displaying said playbook summary view, said displaying said playbook summary view comprising displaying a folders and views section, displaying a task title display and selection area, a summary task creation button, and displaying a detailed task creation button, wherein said folders and views section, said task title display and selection area, said summary task creation button, and said detailed task creation button visually appear together in an undivided display area within said playbook summary view;

enabling communication between team members of a team and the playbook database via a server coupled to the playbook database and an intranet coupled to both the server and the team members, said team members having responsibility for said designing and implementing of said GP/AP system;

generating and displaying a summary task template of the plurality of templates for a selected first task of tasks identified in the task title display and selection area, said summary task template being generated and displayed in response to a selection of the summary task creation button, said summary task template including summary parameters of the selected first task, said generated summary task template being derived from said playbook database; and generating and displaying a detailed task template of the plurality of templates for a selected second task of tasks identified in the task title display and selection area, said detailed task template being generated and displayed in response to a selection of the detailed task creation button, said detailed task template including detailed parameters of the selected second task, said generated detailed task template being derived from said playbook database, wherein said generating and displaying the detailed task template relating to the selected second task comprises:

generating and displaying in the detailed task template creation status items comprising: a category pertaining to the summary task template, a project team responsible for the second task, an offering type of product being brought to a client, an assessment stage of the second task, an owner of the summary task template, an author of the summary task template, and an approval status of the second task;

generating and displaying in the detailed task template importance buttons comprising: an education yes/no button configured to enable election of whether or not to have a teaching of how to do the second task included in an education package to the customer, a certification yes/no button configured to enable election of whether or not to certify a service provider of the second task, an auditable yes/no button configured to enable indicating whether or not performance of the second task by the service provider of the second task is to be audited, a milestone yes/no button configured to enable indicating whether or not the second task is critical to accomplishment of the offering type of product displayed in the creation status section, and a critical path yes/no button configured to enable indicating whether or not the second task that must be completed in order to advance to a next task in order to complete the offering type of product displayed in the creation status section;

generating and displaying in the detailed task template implementation items comprising: a task order number assigned to a detailed task that shows its order under the second task, a percent completion estimate of how complete the second task is in its development for the customer, a name of the service provider of the second task, a technical team responsible for doing the second task, a priority based on whether the second task needs to be done in support of some subsequent task, an estimated time to complete the second task, a task status indicating how far the service provider of the second task has progressed in its implementation of the second task, people needed to support completion of the second task, and a person executing the second task.

2. The system of claim 1,
said folders and views section including category buttons relating to categories of tasks associated with said designing, implementing, and using said GP/AP system,
said task title display and selection area adapted to include buttons for selecting tasks pertinent to said categories of tasks,
said buttons for selecting tasks identifying said tasks which may be so selected,
said buttons for selecting tasks adapted to be displayed in said task title display and selection area in response to a selection of a button of the category buttons.

3. The system of claim 1, said method further comprising:
optimizing a solution for out-sourcing procurement of goods and services under the GP/AP system, wherein said optimizing the solution for out-sourcing procurement of goods and services under the GP/AP system comprises utilizing said generating and displaying the playbook summary view, said generating and displaying the summary task template, and said generating and displaying the detailed task template;
managing service providers of services to the customer to assure quality of service from said service providers, wherein said optimizing the solution for out-sourcing procurement of goods and services under the GP/AP system comprises utilizing said generating and displaying the playbook summary view, said generating and displaying the summary task template, and said generating and displaying the detailed task template; and
optimizing the GP/AP system, said optimized GP/AP system being characterized by lower costs, a paperless process, and more comprehensive service with a shorter cycle time, wherein said optimizing the project relating to the GP/AP system comprises utilizing said generating and displaying the playbook summary view, said generating and displaying the summary task template, and said generating and displaying the detailed task template.

4. The system of claim 1, wherein said generating and displaying the detailed task template relating to the selected second task further comprises:
generating and displaying in the detailed task template detailed task items comprising: tasks that must be completed before the second task can be completed, steps that need to be accomplished to complete the second task, a description of what needs to be analyzed to generate a right answer for the customer, an expected output of the second task, and attachments selected from the group consisting of presentation charts, questionnaires, and architecture charts;
generating and displaying in the detailed task template project reference area items comprising: comments, a check of deliverables pertaining to the second task, a list of approvers of the second task and a status of approval of the second task by the approvers of the second task, and a list of approvers of a second document pertaining to the second task, and a listing of persons who have modified the second document during preparation of the second document.

5. The system of claim 1, wherein said method comprises in conjunction with a project design and development phase of the GP/AP system:
providing and documenting in the playbook database: business controls that provide a comprehensive process that identifies key control points and establishes detailed procedures to assure a quality installation, transformation management, and SAP and requisition and catalog customization required for an integrated approach to a complete customer solution.

6. The system of claim 5, wherein said method comprises:
performing controls to prevent unauthorized modification and/or use of an application of the GP/AP system;
performing logical access control of application data pertaining to the application;
performing a logging mechanism to ensure that an audit trail is correct;
performing change control to control changes to tables and programs;
performing input controls to insure accuracy and completeness of information entering the application;
performing processing controls for entry of data to ensure accuracy and completeness of data during computer processing;
performing error handling controls for error handling and reprocessing of transactions;
performing output controls to ensure an integrity of output data resulting from computer processing;
verifying that procedures to reconcile output to input are effective;
performing disaster recovery to provide for continuity or rapid system restoration of a business process immediately following a natural or man-made emergency or disaster;
performing records management to verify that information is managed with sound business practices and controls;
verifying that reports are distributed properly; and
verifying that any questions particular to a specific country are completed.

7. The system of claim 1, wherein said method comprises simultaneously displaying in the task title display and selection area a listing of tasks of: assessment, business controls, configuration, education, image, information technology, marketing, process, project management, SAP, testing, and transition management.

8. The system of claim 7, wherein said simultaneously displaying the listing of tasks comprises simultaneously displaying in the task title display and selection area:
subtasks of the task of assessment, said subtasks of the task of assessment comprising performing customer business, developing a workshop management plan, reviewing findings from marketing, formulating a workshop approach, preparing for a workshop, presenting a service offering to the customer, formulating a proposal approach, developing and costing a proposal, and drafting and pricing a customer contract;
subtasks of the task of business controls, said subtasks of the task of business controls comprising confirming business controls requirements, confirming separation of duties requirements, conducting application systems control and an auditability (ASCA) self-assessment, conducting risk assessment, conducting an ASCA/business controls review, and confirming an image production system management strategy;
subtasks of the task of configuration, said subtasks of the task of configuration comprising defining a requisition and catalog functional detailed fit, resolving functional gaps for requisition and catalog, confirming a requisition and catalog organizational hierarchy, configuring a requisition and catalog offering, confirming and refining requisition and catalog initial settings and organizational structure, confirming and refining requisition and catalog authorizations, refining and validating a final requisition and catalog configuration, validating and customizing a requisition and catalog core application change request, refining and validating a final customization for requisition and catalog, and validating and coding bridge change requests;
subtasks of the task of education, said subtasks of the task of education comprising defining a training requirement and approach, confirming an education and training strategy, defining a SAP correction and transport process, defining and agreeing on a service level agreement, defining and administering a SAP release control process, defining a requisition and catalog transport process, defining and administering a version control process, defining customer user audiences and requirements, confirming user documentation requirements and standards, conducting detailed end-user task analysis, assessing user skills and training needs, validating end-user courses and content, identifying users and course attendees, defining and notifying training attendees, developing user training documentation, producing customer specific end-user documentation, confirming training evaluation materials/approach with the customer, setting up a training system, validating training logistics, conducting pilot training with super users, arranging documentation and training material production, identifying and organizing internal training, conducting end-user training, conducting train-the-trainer sessions, performing training, and conducting new buyer training;
subtasks of the task of image, said subtasks of the task of image comprising resolving image functional gaps, configuring an image offering, refining and validating a final image configuration, and confirming and refining image initial settings;
subtasks of the task of information technology, said subtasks of the task of information technology comprising confirming component delivery, establishing a network/computing hardware/software architecture, establishing an electronic data interchange (EDI) infrastructure, conducting trading partner testing, confirming an EDI strategy, setting up image system environments, establishing a cutover checklist and performing pre-cutover activities for an image production environment, validating image production support for system management, developing a reporting infrastructure, performing a bridge architecture assessment, performing a bridge architecture integration point interfaces work session, defining a bridge architecture project objectives document, developing and managing a bridge architecture implementation work plan, analyzing EDI requirements, determining an EDI communication environment, analyzing a vendor master data load, analyzing operational reporting requirements, scheduling and conducting a weekly interlock meeting, setting up a SAP development/integration environment, setting up requisition and catalog system environments, setting up a consolidation/test environment, setting up a SAP consolidation/test environment, converting a vendor master into a production environment, determining EDI tasks for a production environment set up, executing a SAP cutover checklist, setting up a SAP production environment, establishing a SAP batch schedule, setting up trading partners in a production environment, establishing a cutover checklist and performing pre-cutover activities for a SAP production environment, performing on-going support activities for requisition and catalog, developing new bridges and application extensions post go live, supporting new EDI transactions post go live, executing system management security support procedures, executing data management support procedures, executing EDI support procedures, executing system management operational support desk procedures, executing system management batch support desk procedures, executing system management master data support procedures, executing production support for system management, establishing a vendor master environment, confirming the vendor master, developing a detail architecture requirements definition, analyzing a current network/computing infrastructure, determining network/computing requirements for a project, confirming and beginning a network/computing component acquisition, and ordering and delivering infrastructure components;

subtasks of the task of marketing, said subtasks of the task of marketing comprising qualifying a potential client, and developing an assessment statement of work;

subtasks of the task of process, said subtasks of the task of process comprising conducting customer introduction to procurement and A/P processes, reviewing procurement processes with the customer, reviewing A/P processes with the customer, identifying current and potential supplier catalogs for the customer, performing an assessment of the customer's purchasing business, updating and reviewing a process management and procedures manual, managing a trading partner, establishing for the customer SAP suppliers not requiring a buyer, and managing customer supplier outline agreements;

subtasks of the task of project management, said subtasks of the task of project management comprising confirming project scope and implementation strategy, confirming project organization and assign resources to roles, preparing and validating project plan and procedures, establishing a project team working environment, orienting a project team, confirming and refining project management standards and procedures, confirming and refining an issue management plan, confirming and refining project documentation, confirming and refining quality assurance standards, creating a team building plan, confirming implementation strategies, confirming system configuration standards, customizing an image offering, validating and customizing an image core application change request, confirming a testing strategy, confirming a production support and operations strategy, confirming a SAP production system, confirming a network/computing strategy, confirming a vendor conversion strategy, conducting a kick-off meeting, conducting a project team standards meeting, conducting a project team training, define system management SAP resource requirements, defining a production support accounts payable plan, defining a production support general procurement plan, confirming SAP system authorizations for a project team, confirming a requisition and catalog access control list, defining system management image resource requirements, conducting an initial quality assurance review, conducting an initial quality assurance review, conducting project team status meetings, conducting steering committee meetings, conducting a lost bid analysis, validating production support, validating SAP production support for system management, validating production support for accounts payable, validating requisition and catalog production support for system management, validating education and training production support activities, ensuring go live check lists activities, ensuring a go/no-go decision for go live, and confirming a production environment;

subtasks of the task of requisition and catalog, said subtasks of the task of requisition and catalog comprising identifying country/global administrators, performing country administrator education, performing requisition and catalog tasks, confirming requisition and catalog for a production environment, setting up requisition and catalog tables in production, preparing requisition and catalog production copy, and executing a requisition and catalog go live checklist;

subtasks of the task of SAP, said subtasks of the task of SAP comprising confirming a SAP organizational hierarchy, defining a SAP functional detailed fit, resolving SAP functional gaps, developing and validating SAP custom programs, confirming and refining an implementation guide, confirming and refining SAP initial settings and organizational structure, confirming and refining SAP end user authorization profiles, refining and validating a final SAP configuration, validating and customizing a SAP core application change request, and refining and validating a final customization for SAP;

subtasks of the task of testing, said subtasks of the task of testing comprising confirming and refining test case templates, building a comprehensive test plan, developing a test environment plan, creating test case specifications, building/reusing test cases, determining testing tools, reviewing and validating a comprehensive test plan, performing a unit test, performing a component test, performing an integration test, administering network/computing performance monitoring, performing a system test, performing a user acceptance test, performing other required testing, supporting comprehensive image testing, and supporting comprehensive SAP testing;

subtasks of the task of transition management, said subtasks of the task of transition management comprising developing an initial assessment of the customer, providing a transition management workshop presentation, providing a transition management strategy, evaluating a cultural impact of solution, developing/confirming a transition management plan, building/confirming a campaign plan, updating a communication strategy, delivering an announcement/kickoff communication, creating an incentive/reward program, assessing supplier impacts related to transition management, assessing enterprise support impacts related to transition management, designing detail go live material/activities, creating policy changes, identifying/planning for security, ensuring a new process management systems is in place, performing a client readiness assessment, performing transition management go live activities, managing human resources activities, providing thanks to users/suppliers, monitoring human resource issues, assessing effectiveness of a transition management program, administering a post go live survey, and presenting and acting upon survey findings.

9. The system claim 1,
wherein said creating the playbook database comprises creating a first template of the plurality of templates in the playbook database such that the first template includes or is linked to a document pertinent to guiding, coordinating and documenting work of a first team member of the team;

wherein said creating the playbook database comprises creating a second template of the plurality of templates in the playbook database such that the second template includes or is linked to an instruction pertinent to guiding, coordinating and documenting work of a second team member of the team;

wherein said creating the playbook database comprises creating a third template in the plurality of templates in the playbook database such that the third template includes or is linked to a flow chart pertinent to guiding, coordinating and documenting work of a third team member of the team;

wherein said creating the playbook database comprises creating a fourth template in the plurality of templates in the playbook database such that the fourth template includes or is linked to a questionnaire pertinent to guiding, coordinating and documenting work of a fourth team member of the team;

wherein said creating the playbook database comprises creating a fifth template in the plurality of templates in the playbook database such that the fifth template includes or is linked to a report model pertinent to guiding, coordinating and documenting work of a fifth team member of the team;

wherein said creating the playbook database comprises creating a sixth template in the plurality of templates in the playbook database such that the sixth template includes or is linked to a checklist pertinent to guiding, coordinating and documenting work of a sixth team member of the team.

10. A system comprising a computer configured to execute a program of instructions stored on a program storage device to perform a method for coordinating a project for designing, implementing, and using a general procurement and accounts payable (GP/AP) system for a customer, said method comprising:

creating a playbook database, said playbook database comprising a plurality of templates of information relating to said designing, implementing, and using said GP/AP system, said plurality of templates being particularized for the customer;

generating a playbook summary view from said playbook database;

displaying said playbook summary view, said displaying said playbook summary view comprising displaying a folders and views section, displaying a task title display and selection area, a summary task creation button, and displaying a detailed task creation button, wherein said folders and views section, said task title display and selection area, said summary task creation button, and said detailed task creation button visually appear together in an undivided display area within said playbook summary view;

enabling communication between team members of a team and the playbook database via a server coupled to the playbook database and an intranet coupled to both the server and the team members, said team members having responsibility for said designing and implementing of said GP/AP system;

generating and displaying a summary task template of the plurality of templates for a selected first task of tasks identified in the task title display and selection area, said summary task template being generated and displayed in response to a selection of the summary task creation button, said summary task template including summary parameters of the selected first task, said generated summary task template being derived from said playbook database; and generating and displaying a detailed task template of the plurality of templates for a selected second task of tasks identified in the task title display and selection area, said detailed task template being generated and displayed in response to a selection of the detailed task creation button, said detailed task template including detailed parameters of the selected second task, said generated detailed task template being derived from said playbook database, wherein said generating and displaying the summary task template relating to the selected first task comprises:

generating and displaying in the summary task template creation status items comprising: a category pertaining to the summary task template, a project team responsible for the first task, an offering type of product being brought to a client, an assessment stage of the first task, an owner of the summary task template, an author of the summary task template, and an approval status of the first task;

generating and displaying in the summary task template importance buttons comprising: an education yes/no button configured to enable election of whether or not to have a teaching of how to do the first task included in an education package to the customer, a certification yes/no button configured to enable election of whether or not to certify a service provider of the first task, an auditable yes/no button configured to enable indicating whether or not performance of the first task by the service provider of the first task is to be audited, a milestone yes/no button configured to enable indicating whether or not the first task is critical to accomplishment of the offering type of product displayed in the creation status section, and a critical path yes/no button configured to enable indicating whether or not the first task that must be completed in order to advance to a next task in order to complete the offering type of product displayed in the creation status section;

generating and displaying in the summary task template implementation items comprising: a task order number assigned to a detailed task that shows its order under the first task, a percent completion estimate of how complete the first task is in its development for the customer, a name of the service provider of the first task, a technical team responsible for doing the first task, a priority based on whether the first task needs to be done in support of some subsequent task, an estimated time to complete the first task, and a task status indicating how far the service provider of the first task has progressed in its implementation of the first task.

11. The system of claim 10, wherein said generating and displaying the summary task template relating to the selected first task further comprises:

generating and displaying in the summary task template summary task details comprising: a high level summary description of major operations or steps pertaining to the first task, assumptions pertaining to the first task, tasks that must be completed before the first task can be completed, a description of tools, techniques, relationships, understandings, technical and relationship skills and commitments, and knowledge base of the team and the customer needed to accomplish the first task, and expected output of the first task;

generating and displaying in the summary task template approval items comprising: an identity of approvers for the first task, a date of notification of the approvers of the first task, and electronic signature of approval of the first task;

generating and displaying in the summary task template project reference items comprising: general comments, a checklist of deliverables pertaining to the first task, a list of approvers of a first document pertaining to the first task, and a listing of persons who have modified the first document during preparation of the first document.

* * * * *